United States Patent [19]

Abe

[11] Patent Number: 4,850,025

[45] Date of Patent: Jul. 18, 1989

[54] CHARACTER RECOGNITION SYSTEM

[75] Inventor: Keiko Abe, Kanagawa, Japan

[73] Assignee: Sony Corporation, Tokyo, Japan

[21] Appl. No.: 910,890

[22] Filed: Sep. 23, 1986

[30] Foreign Application Priority Data

Sep. 27, 1985 [JP] Japan .................................. 60-213755

[51] Int. Cl.⁴ .............................................. G06K 9/34
[52] U.S. Cl. .......................................... 382/9; 382/37
[58] Field of Search .................. 382/9, 51, 48, 18, 30, 382/37

[56] References Cited

U.S. PATENT DOCUMENTS

| | | | |
|---|---|---|---|
| 3,846,752 | 11/1974 | Nakano | 382/30 |
| 4,045,773 | 8/1977 | Kadota | 382/9 |
| 4,377,803 | 3/1983 | Lotspiech | 382/9 |
| 4,527,283 | 7/1985 | Ito | 382/9 |
| 4,594,732 | 6/1986 | Tsuji | 382/18 |
| 4,610,025 | 9/1986 | Blum | 382/9 |
| 4,654,873 | 3/1987 | Fujisawa | 382/9 |

FOREIGN PATENT DOCUMENTS

| | | |
|---|---|---|
| 0166271 | 2/1986 | European Pat. Off. |
| 1144319 | 3/1969 | United Kingdom . |
| 1179916 | 2/1970 | United Kingdom . |
| 1337159 | 11/1973 | United Kingdom . |
| 1442273 | 7/1976 | United Kingdom . |
| 1454148 | 10/1976 | United Kingdom . |
| 1597775 | 9/1981 | United Kingdom . |
| 80/02761 | 12/1980 | World Int. Prop. O. |

*Primary Examiner*—Leo H. Boudreau
*Attorney, Agent, or Firm*—Philip M. Shaw, Jr.

[57] ABSTRACT

A character recognition system extracts character blocks to contain a minimum character unit therein. The character recognition system has the capability of re-combining and/or re-extracting character blocks during the character recognition process. Re-combination and re-extraction of the character blocks is controlled based on the history of the extraction process for each of the character blocks so that re-combination and re-extraction can be performed effectively.

63 Claims, 8 Drawing Sheets

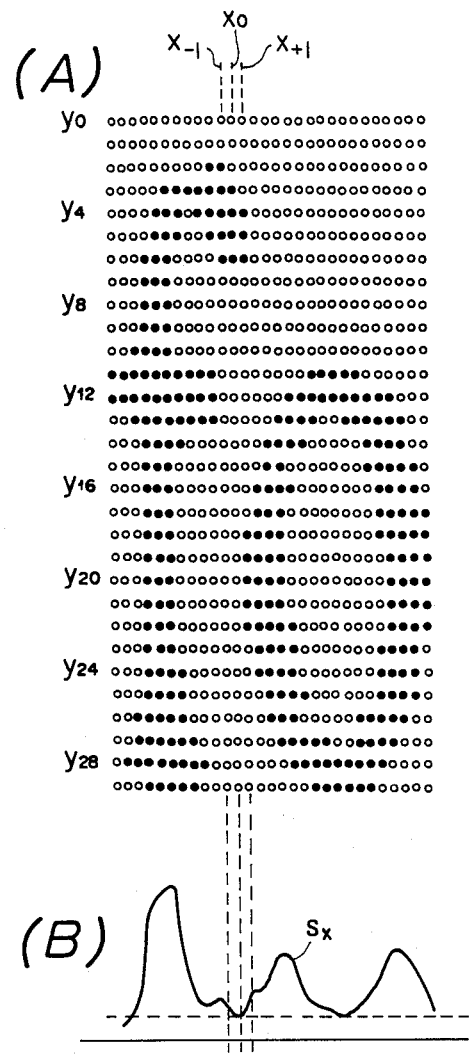
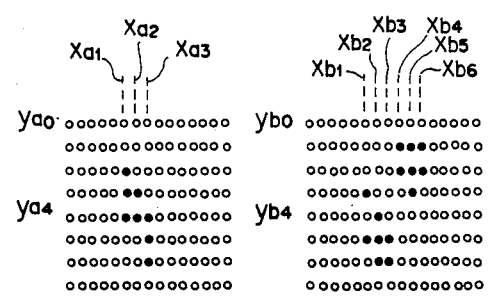
FIG. 7
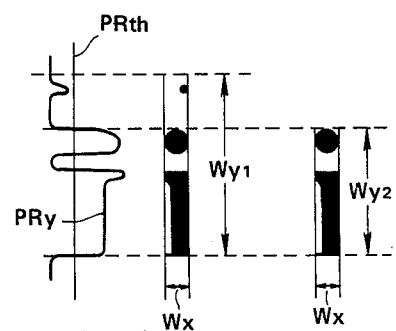
FIG. 8
FIG. 6

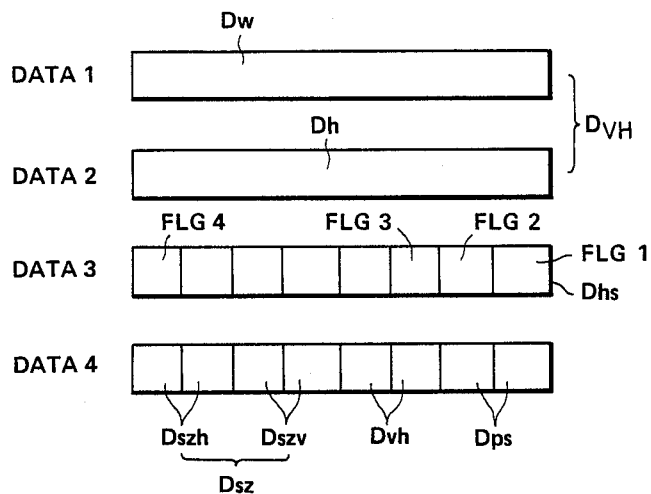
FIG. 12
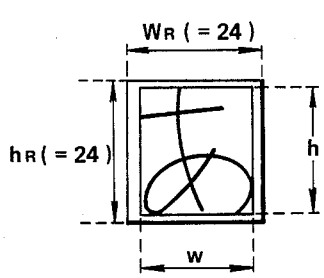
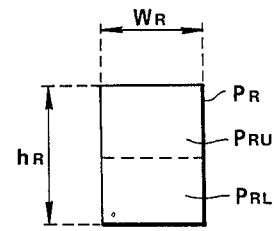
FIG. 13     FIG. 14

CHARACTER RECOGNITION SYSTEM

BACKGROUND OF THE INVENTION

1. Field of the Invention

The present invention relates generally to a character recognition system for recognizing characters on a master document. More specifically, the invention relates to a character recognition system which is specifically adapted to recognize characters having mutually separated character components, such as "Chinese" characters, Japanese "Hiragana" and "Katakana" characters and so forth. Also, the invention relates to a character recognition system which is suitable for picking-up character data from a master document containing a mixture of Japanese or Chinese characters and alphabetic characters, such as English, German and so forth.

2. Description of the Background Art

In recent years, there have been developed and proposed various character recognition systems for picking up character data from a master document. In such character recognition systems it is difficult to pick up character data from a master document written in Japanese, Chinese and so forth. The difficulty is due to the presence of some characters in Japanese, Chinese or other equivalent languages, which have disjoint or mutually separated character components. For example, the Japanese Kanji character which means a river, has three substantially vertically extending and mutually separated character components and the Japanese Hiragana character "い" to be pronounced "i" has two substantially vertically extending and mutually separated characters. Throughout the present application, characters having mutually separated character components will be referred to as "separating characters".

A character recognition system generally extracts or segments each character on the master document and compares the character structure with pre-set data to recognize the character. The recognized character is usually converted into a computer applicable code, such as ASCII code and so forth. Accurately extracting the separating character has been very difficult because of the presence of a space or discontinuity between the character components.

On the other hand, in English, German or other alphabetic languages, the space between the characters in a word is substantially narrower than that between the words. Because of the narrow spacing between the alphabetic characters in the word, when an alphabetic character document is read by a character recognition system which is designed for scanning Japanese or Chinese character documents, the space between the characters in the word tends to be ignored. This results in picking up of an image of the overall word as a unit. This makes it impossible to recognize each alphabetic character in the document.

This problem in recognizing characters is especially severe when the character recognition system is used for reading and picking up character data from a master document containing a mixture of both Japanese or Chinese characters and alphabetic characters.

Furthermore, in the prior proposed systems, the extraction of the character to be recognized and recognition of the character are performed in mutually independent steps. Generally, the step of extracting characters is performed in advance of the step of recognizing the character. When the structure of the extracted character does not match any of the pre-set character patterns, the character is treated as a non-recognizable character. This significantly lowers the character recognition rate of the character recognition system.

SUMMARY OF THE INVENTION

Therefore, it is an object of the present invention to provide a character recognition system which can resolve the difficulty of accurately reading mixed alphabetic and Japanese and Chinese characters encountered by conventional systems and provide a substantially high recognition rate.

A further object of the invention is to provide a character recognition system which allows a combination of the separately excised image data, separation of the excised image data, re-excision and so forth to assure recognition of the characters on the master document.

In order to accomplish the above-mentioned and other objects, a character recognition system, according to the present invention, extracts character blocks to contain a minimum character unit therein. The character recognition system has the capability of re-combining and/or re-extracting character blocks during the character recognition process. Re-combination and re-extraction of the character blocks is controlled based on extraction history data of each of the character blocks so that re-combination and re-extraction can be performed effectively.

In the preferred process of extracting the character blocks, substantially adjoining mutually independent characters in a single character block are checked and separated into two or more character blocks in order to minimize the number of character units contained in each character block.

The character recognition system, according to the present invention, further has the capability of distinguishing Japanese and Kanji characters from alphabetic characters based on the particular proportion of the Japanese and Kanji characters, which proportion is substantially distinct from that of the alphabetic characters.

According to one aspect of the invention, an optical scanning means scans the document to obtain a video signal containing image data from said document. Extracting extracts character blocks from the video signal, wherein each character block contains image data of individual characters from said document. The extracting means further produces predetermined history data of each character block indicative of the process of extraction of said character block. Combining means compares ratios of predefined dimensional attributes of each character block with predetermined standard ratios and selectively recombines two or more of the extracted character blocks based on such comparison in order to form a combined character block. Character recognition means receives the extracted character blocks and the recombined character blocks and performs character recognition according to predetermined algorithms and outputs a signal indicative of a recognized character. Encoding means connected to said extracting means obtains the extraction history data and uses it to control the operation of said combining and character recognition means by means of the extraction history data in such a manner that when said character recognition means fails to recognize a character in said character block, said encoding means selectively causes said combining means to successively combine character blocks until said character recognition means recognizes the character in said character block formed by said combining means.

According to a still further aspect of the invention, there is also included a re-segmenting means, which is supplied with the character block signal and the combined character block signal, for re-segmenting a selected character block for forming a re-segmented character block. This re-segmenting means is also controlled by the encoding means.

The extracting means includes a plurality of segmentation stages including a first segmentation stage for segmenting character-string blocks, a second segmentation stage for segmenting each character block containing character image data of a character unit and a third segmentation stage for checking the continuity of image data containing bits within each character block for detecting discontinuity in order to separate character blocks into more than one character block so as to obtain character blocks containing a minimum character unit, third means for recombining two or more character blocks for forming a combined character block, and fourth means for re-extracting a selected character block for forming a re-extracted character block. The extracting means produces the predetermined history data with respect to at least the second and third segmentation stage, which segmentation history data is indicative of the order or segmentation of the character blocks in each of the second and third stages, for controlling the operation of the recombining, character recognition, and re-segmenting means based on the segmentation data in such a manner that the encoding means selectively operates one of the combining and re-segmenting means when the character recognition means fails to recognize a character in the character block, so as to assure recognition of the character in the character recognition means with the character block formed by a selected one of the combining and re-segmenting means.

According to a yet further aspect of the invention, a method for recognizing characters contained in a document comprises the steps of:
  generating a video signal containing image data of said document;
  from the video data, extracting character blocks, each of which contains image data of individual characters in said document;
  combining two or more character blocks for forming a combined character block;
  re-segmenting a character block for forming a re-segmented character block;
  from the character blocks, the combined character blocks and the re-segmented character blocks, performing character recognition according to predetermined algorithms and outputting a "recognized character" indicative signal; and
  controlling the combining step, re-segmenting step and character recognition step in such a manner that the combining step, re-segmenting step and character recognition step are selectively performed to ensure recognition of characters by repeating said combining step, re-segmenting step and character recognition step with respect to a selected one or a selected succession of character blocks, combined character blocks or re-segmented character blocks until character recognition is achieved.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

The present invention will be understood more fully from the detailed description to be given and from the accompanying drawings of the preferred embodiment of the invention, which, however, should not be taken to limit the invention to the specific embodiment illustrated but are for explanation and understanding only.

In the drawings:

FIGS. 3(A) and 3(B) are explanatory illustrations showing the manner in which the character string block segmentation is performed in an area-segmentation stage in the preferred embodiment of the character recognition system of FIG. 1, in which FIG. 3(A) shows the y-projection profile of the text area AR of FIG. 2, and FIG. 3(B) shows character-string block segmentation data derived from the y-projection profile of FIG. 3(A);

FIGS. 5(A), 5($B_1$), 5($B_2$), 5($C_1$) and 5($C_2$) are explanatory illustrations showing the manner in which provisional character block segmentation is performed in a first sub-stage in a character block segmentation stage in the character recognition stage of FIG. 4, in which FIG. 5(A) shows an example of characters contained in the character string block, FIGS. 5($B_1$) and 5($C_1$) respectively show identical x-projection profiles, and FIGS. 5($B_2$) and 5($C_2$) show segmentation block indicative signals derived by rough segmentation and precise segmentation performed in the first sub-stage;

FIGS. 6(A) and 6(B) show examples of overlapping characters and the x-projection profiles thereof;

FIGS. 7(A) and 7(B) are explanatory illustrations showing the manner of separating character blocks containing overlapping characters;

FIGS. 8(A) and 8(B) are explanatory illustrations showing the operation in a third sub-stage in the character block segmentation stage in the character recognition stage of FIG. 4;

FIG. 12 is an explanatory illustration showing the construction of excised data stored in a excised data memory in the character recognizing stage of FIG. 4;

FIG. 13 is an explanatory illustration showing the proportion of vertical and horizontal length of the excising area for excising individual characters;

FIG. 14 is an explanatory illustration showing the construction of the excising position data;

DESCRIPTION OF THE PREFERRED EMBODIMENT

Figure 1:
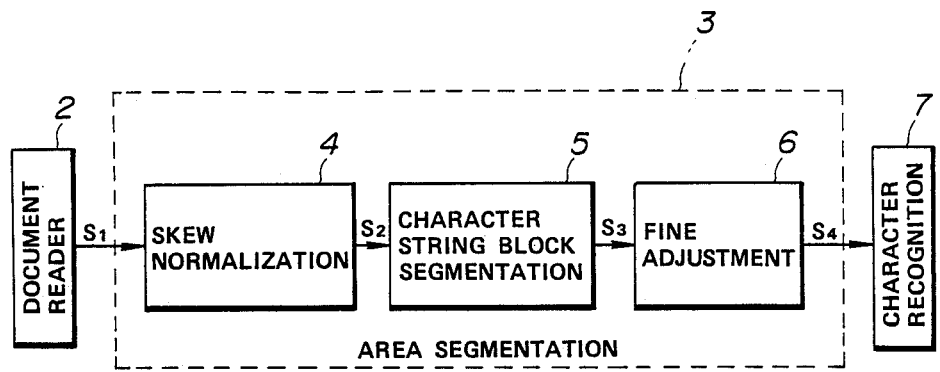
FIG. 1 is a schematic block diagram showing the general construction of a character recognition system according to the invention.

Referring now to the drawings, particularly to FIG. 1, the preferred embodiment of a character recognition system, according to the invention, is associated with a known document reader 2 which optically reads a document and produces document image data $S_1$. The character recognition system is connected to the document reader for receiving the document image data $S_1$ to process the received document image data to convert the image data of respective characters into computer applicable code, such as ASCII code. The character recognition system includes an area segmentation section 3 which is connected to the document reader 2. Therefore, the image data $S_1$ produced by the document reader is transferred to the area segmentation section 3.

The area segmentation section 3 includes a skew normalization stage 4. In the skew normalization stage 4, noise in the document image data $S_1$ is filtered out and document skew with respect to an x- and y-axes coordinate system of the recognition system is normalized. In the shown embodiment, the x-axis of the coordinate system of the character recognition system extends in the horizontal direction and the y-axis extends in the vertical direction. Namely, the x-axis of the coordinate system extends parallel to the horizontal scanning lines and the y-axis extends parallel to the vertical scanning lines, when the skew of the document image is normalized.

Figure 2:
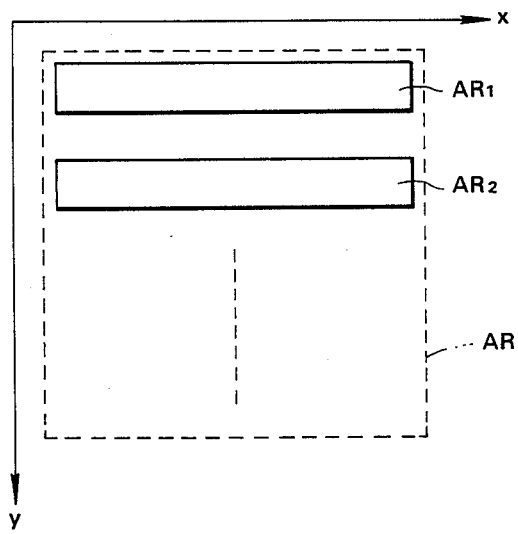
FIG. 2 is an explanatory illustration showing the manner of excising character strings for picking up character string data from the master document.

In the skew normalization stage, skew-normalized image data $S_2$ is produced and transferred to a character-string block segmentation stage 5. In the character-string block segmentation stage 5, text area or areas are distinguished from graphic areas containing graphic images, such as photographs, illustrations, drawings and so forth. Since a graphic image in the document image may serve as noise and interfering factors in character recognition, such graphic image data has to be removed before entry into character recognition stage. The text area extraction is thus performed in a per se known manner to extract a text area AR (as shown in FIG. 2). Therefore, in the text area extracting operation by the character-string block segmentation block 5, the text area AR containing the text image is defined and the image data in the text area is extracted. Text image data is thus produced.

Figure 3:
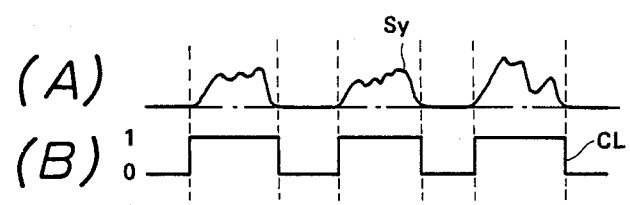

The text image data is then processed for character-string block segmentation in the character-string block segmentation stage 5. In the disclosure, the word "character-string" or "character string" is used to represent a string of characters aligned horizontally in a single line of the text. For segmentation of character-string blocks $AR_1$, $AR_2$ a vertical projection profile (as shown in FIG. 3) is obtained. In the following disclosure, the vertical projection profile shown in FIG. 3(A) will be referred to as the "y-projection signal $S_y$". As will be appreciated, the y-projection signal $S_y$ contains a signal value representative of the number of black bits or logical HIGH bits which contain a black image on the corresponding horizontal scanning line. Therefore, the value of the y-projection signal $S_y$ corresponding to the horizontal scanning lines positioned in a line space between character strings, and thus having no logical HIGH bit, becomes zero to thereby distinguish between the horizontal scanning lines lying in the character string region and those lying in the blank region, such as in the line spaces. In the character-string block segmentation stage 5 the y-projection signal value is checked. A series of horizontal lines corresponding to the y-projection signals $S_y$ and having values greater than zero, is taken as the character-string blocks $AR_1$, $AR_2$ .. for instance. Based on this, character-string block segmentation data CL (as shown in FIG. 3(B)) is produced by the character-string block segmentation stage 5. The character-string block segmentation data CL has a HIGH level (logical "1") in the region corresponding to the character-string block and a LOW level (logical "0") in the region corresponding to the line space between the character-string blocks. In the character-string block segmentation stage 5 the horizontal scanning lines containing text image data corresponding to the character-string blocks are extracted and output as character-string block image data $S_3$, based on the character-string block segmentation data CL.

The character-string block image data $S_3$ is processed in a fine-adjustment stage 6. In the fine adjustment stage 6, fine adjustment of the character orientation for skew normalization and noise filtering is again performed. The character-string block image data $S_3$ for which the fine adjustment and noise filtering is performed is output to a character recognition section 7, which will be described later with reference mainly to FIG. 4, as area-segmentation data $S_4$.

It should be appreciated that the areasegmentation data $S_4$ basically contains image data in the horizontal scanning lines in the character-string blocks segmented by the character-string block segmentation stage 5. Each character-string block $AR_1$, $AR_2$ ... has a height which is determined by the highest coarse upper contour and lowest coarse lower contour of the characters therein. The height of the character-string block $AR_1$, $AR_2$ thus defined will be hereafter referred to as the "character-string height".

Figure 4:
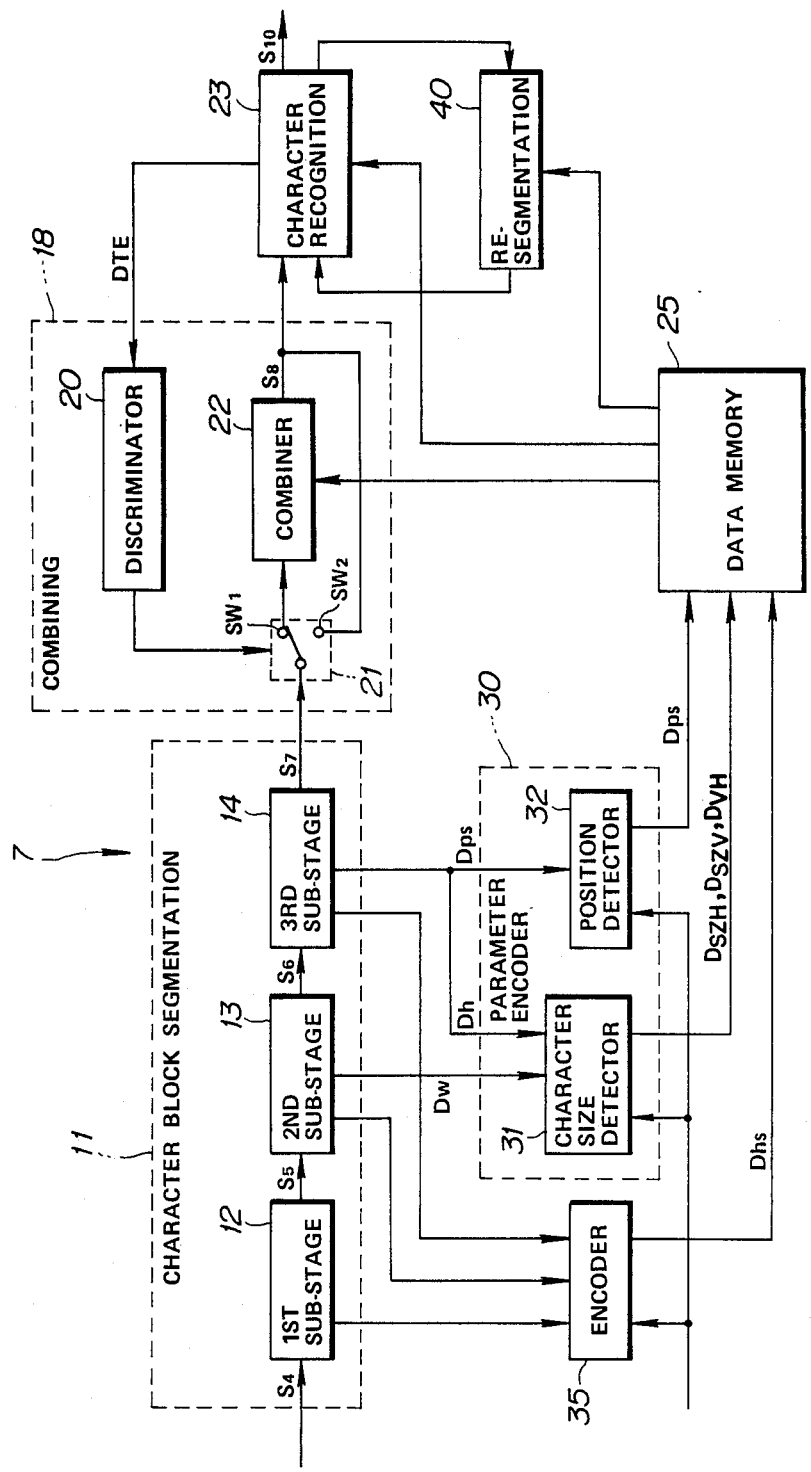
FIG. 4 is a block diagram of a character recognition stage in the preferred embodiment of the character recognition system according to the invention.

The detailed structure of the character recognition section 7 is illustrated in FIG. 4. The character recognition section 7 generally performs character segmentation for extracting image data of each individual character and character recognition by comparing the structure indicated by the image data of the segmented character with preset character data. In the preferred embodiment of the character recognition system, according to the present invention, re-segmentation of the character or combining of two or more character blocks for recognition of the separated character can be performed. So as to enable re-segmentation and/or combining of two or more character blocks, the segmentation history in the character block segmentation process is stored.

As shown in FIG. 4, the character recognition section 7 comprises a character block segmentation stage 11, a character block combining stage 18, a character recognition stage 23, a parameter encoding stage 30, a segmentation history encoding stage 35, and a re-segmentation stage 40. A data memory 25 is included in the character recognition section 7 for storing the segmentation data. Based on the segmentation data stored in the data memory 25, the operations of the character block combining stage 18, the character recognition stage and the re-segmentation stage 40 are controlled.

The character block segmentation stage 11 includes first, second and third sub-stages 12, 13 and 14. The character block segmentation is performed through these first, second and third sub-stages 12, 13 and 14 for extracting character image data. Basically, the character image data extracted in the character block segmentation stage 11 is utilized for character recognition in the character recognition stage 23. When character recognition cannot be made from the character image data extracted in the character segmentation stage 11, then character blocks are combined by the combining stage 18 for again performing character recognition in the character recognition stage 23 utilizing the character image of the combined character blocks. Otherwise, when character recognition cannot be made, re-segmentation of the character block is performed in the re-segmentation stage 40.

Each component of the character recognition section 7 will be described in detail in the separate sections.

Character Block Segmentation First Sub-Stage 12

The character recognition section 7 is connected to the area segmentation section 3 through the first sub-stage 12 of the character block segmentation stage 11. Therefore, the area-segmentation data $S_4$ is input to the first sub-stage 12. In the first sub-stage 12, first and provisional character block segmentation takes place. In order to perform first character block segmentation in the first sub-stage 12 of the character block segmentation stage 11, a vertical projection profile, which will be hereafter referred to as the "x-projection profile" or the "x-projection signal $S_x$," is obtained. The manner of forming the x-projection signal $S_x$ and the waveform thereof will be seen in FIG. 5, for instance. Similar to the aforementioned y-projection signal $S_y$, discussed with respect to character-string block segmentation, the x-projection signal $S_x$ has a value corresponding to the number of logical HIGH bits on the corresponding vertical scanning line. Therefore, when the vertical scanning line contains character image data and thus has one or more bits having a logical HIGH level ("1"), then the value of the x-projection signal $S_x$ becomes greater than zero. On the other hand, when the corresponding vertical scanning line extends through the space between individual characters, no logical HIGH level bit exists. Therefore, the value of the x-projection signal $S_4$ becomes zero.

Figure 5:
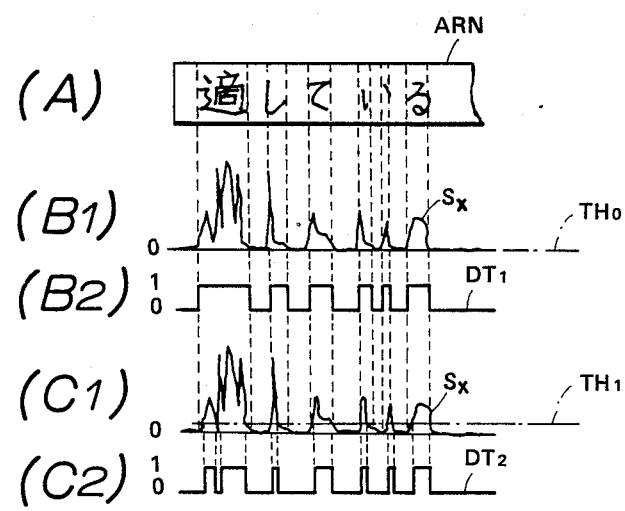

In the example of FIG. 5, a Kanja (Chinese) character " 適 " and Japanese characters " し ", " 7 ", " ( ", and " る " are included in the n-th character-string block ARN. These characters constitute in combination a Japanese word meaning "suitable" or "adapted". The x-projection signals $S_x$ of these characters are shown in FIGS. $5(B_1)$ and $5(C_1)$. In the pesent invention, it is recommended that a plurality of threshold levels be utilized for performing provisional character block segmentation at different segmentation precision levels. Generally, the x-projection signal level is higher in the horizontal center portion of each character block than that in the horizontal end portions. Therefore, the level of the x-projection signal $S_x$ reduces toward the side contours of the characters. Therefore, by performing provisional character block segmentation with different threshold levels, the width of the extracted character block varies. This is advantageously utilized when the space between adjacent individual characters are substantially narrow. In other words, when characters are arranged in a tight arrangement, two or more characters tend to be included in the provisionally segmented character block, if the segmentation is performed with only a threshold level of zero value. The characters arranged in a tight arrangement and having a substantially narrow or substantially no space therebetween will be referred to hereafter as "overlapping characters". By utilizing a threshold level greater than zero, portions of the character corresponding bit or bits which lie on the vertical scanning line having an x-projection signal value smaller than or equal to the threshold level can be detected to help distinguish overlapping characters.

In the shown embodiment, the higher and lower threshold levels $TH_1$ and $TH_0$ are utilized for character block segmentation. The higher threshold level $TH_1$ is set at the value "1". On the other hand, the lower threshold level $TH_0$ has the value "0". Therefore, in the shown embodiment, the provisional character block segmentation takes place at the higher and lower threshold levels $TH_1$ and $TH_0$. In the following disclosure, the character block segmented by character block segmentation utilizing the lower threshold level will be hereafter referred to as a "wider character block". Similarly, the character block segmented in character segmentation with the higher threshold level $TH_1$ will be hereafter referred to as a "narrower character block". It should further be noted that the provisional character block segmentation utilizing the lower threshold $TH_0$ will be hereafter referred to as a "rough segmentation". Also, the provisional character segmentation with the higher threshold level $TH_1$ will be hereafter referred to as a "precise segmentation".

In the rough segmentation for the character-string block ARN of FIG. 5, the x-projection signal $S_x$ is compared with the lower threshold $TH_0$. As a result, a rough segmentation block indicative signal $DT_1$ (FIG. $5(B_2)$) is produced. The rough segmentation block indicative signal $DT_1$ has logical HIGH level in a region corresponding to the character block width, in which the x-projection signal value is greater than zero. Therefore, the lateral side edges of each character block adjoin the side contour of the corresponding character.

On the other hand, in precise segmentation, the x-projection signal $S_x$ is compared with the higher threshold level $TH_1$. As a result, a precise segmentation block indicative signal DT (FIG. $5(C_2)$) is produced. Similar to the foregoing rough segmentation block indicative signal $DT_1$, the precise segmentation block indicative signal $DT_2$ has a logical HIGH level in a region corresponding to the corresponding narrower character block, in which the x-projection signal $S_x$ has a value greater than the higher threshold level $TH_1$. Since the higher threshold level $TH_1$ is set to "1" in the shown embodiment, the vertical scanning line or lines having single block or logical HIGH level bits are ignored and placed outside of the narrower character block to be segmented. Therefore, each narrower character block segmented in the precise segmentation has a generally narrower character block width in comparison with that of the wider block segmented in the rough segmentation.

As set forth, the preferred embodiment of the character recognition system according to the invention is specifically adapted for character recognition for text including a mixture of Japanese characters and alphabetic characters, such as English, German, French words, sentences or paragraphs. In order to recognize the Japanese or Kanji characters, rough segmentation will be generally preferable since the full-width of a character can be contained within the corresponding character block. On the other hand, because of the higher precision of segmentation, for the alphabetic characters precise segmentation is preferred to accurately segment the character blocks corresponding to single characters. As set forth, by taking the precise segmentation, the overlapping characters can be separated into the corresponding character blocks. On the other hand, in the case of the Japanese character "\)" in FIG. 5(A), which is a separated character, the character components " \ " and " ) " are segmented in separated character blocks either in the rough segmentation or the precise segmentation processes. Such separated character components containing character blocks may be combined by the combining stage 18 which will be described later.

As set forth above, combining of two or more character blocks in the combining stage 18 or re-segmentation to be performed in the re-segmentation stage 40 are controlled based on the segmentation history. The manner of use of the segmentation history of each character block will be discussed later. Therefore, in order to enable the combining of two or more characters by the combining stage 18 or re-segmentation by the re-segmentation stage 40, the rough segmentation block indicative signal $DT_1$ and the data and the precise segmentation block indicative signal $DT_2$ will be input to a history data encoding stage 35 which will be also disclosed later. The history data as encoded by the history data encoding stage 35 is fed to the data memory. On the other hand, the video image data contained in the segmented character blocks in the precise segmentation, i.e. the narrower character block is fed to the second sub-stage 14 as provisionally segmented character block indicative data $S_5$.

Character Block Segmentation Second Sub-Stage 13

The provisionally segmented character data $S_5$ thus produced in the first sub-stage 12, contains video image data of the character, characters or character component in the segmented character block. As will be appreciated from FIG. 5, the character block segmented in the first sub-stage 12 has a variable width depending upon the width of the character therein and has a height corresponding to the character string height. The provisionally segmented character data $S_5$ is fed to the second sub-stage 13. The second sub-stage 13 is designed for separating overlapping characters contained in the single character block obtained either in rough segmentation or precise segmentation.

As example of the overlapping characters to be segmented as a single character is shown in FIG. 6(A). In this example, a single character block segmented by the first sub-stage 12, contains two alphabetic characters, i.e. "f" and "o". As will be seen from FIG. 6(A), the vertical scanning line lying on x-coordinate position of $X_{(+1)}$ adjoins both the right side contour of "f" and the left side contour of "o". Therefore, the x-projection signal $S_x$ at no point drops its signal level below the lower and higher thresholds $TH_0$ and $TH_1$ in the rough and precise segmentation in the first sub-stage. Namely, in the shown example, the minimum x-projection signal value is obtained at the vertical scanning line lying on the x-coordinate of $x_0$. As will be observed, on the $x_0$ vertical scanning line, four logical HIGH bits or black bits are present at respective coordinates positions of $x_0$, $y_3$; $x_0$, $y_4$; $x_0$, $y_5$; and $x_0$, $y_6$. In order to detect that more than one character is contained in the provisionally segmented character block, the continuity of the logical HIGH level bits around the vertical scanning line at which the minimum x-projection signal value is obtained is checked. In the shown embodiment, the continuity of the logical HIGH bits on the $x_{(-1)}$ vertical scanning line, $x_0$ vertical scanning line and $x_{(+1)}$ vertical scanning line are checked. As observed in FIG. 6(A), the $x_{(-1)}$ vertical scanning line contains five logical HIGH bits respectively located at coordinate positions of $x_{(-1)}$, $y_2$; $x_{(-1)}$, $y_3$; $x_{(-1)}$, $y_4$; $x_{(-1)}$, $y_5$; and $x_{(-1)}$, $y_6$. As set forth, the $x_0$ vertical scanning line has logical HIGH bits at $x_0$, $y_3$; $x_0$, $y_4$; $x_0$, $y_5$; and $x_0$, $y_6$. On the other hand, the $x_{(+1)}$ vertical scanning line has logical HIGH bits at $x_{(+1)}$, $y_4$; $x_{(+1)}$, $y_5$; $x_{(+1)}$, $y_6$; $x_{(+1)}$, $y_{18}$; $x_{(+1)}$, $y_{19}$; $x_{(+1)}$, $y_{20}$; $x_{(+1)}$, $y_{21}$; and $x_{(+1)}$, $y_{22}$.

The manner of detecting discontinuity of the character in the single character block will be discussed with reference to FIG. 7(A) and 7(B). In the example of FIG. 7(A), the logical HIGH bits are present respectively at $x_{a1}$, $y_{a2}$; $x_{a1}$, $y_{a3}$; $x_{a1}$, $y_{a4}$; $x_{a2}$, $y_{a3}$; $x_{a2}$, $y_{a4}$; $x_{a3}$, $y_{a4}$; $x_{a3}$, $y_{a5}$; $x_{a3}$, $y_{a5}$; and $x_{a3}$, $y_{a6}$. In this case, every scanning line $x_{a1}$, $x_{a2}$ and $x_{a3}$ has at least one logical HIGH bit continuous to the adjacent bits in the adjacent vertical scanning lines. In such case, the character in the character block is judged to have continuity and is thus regarded as a single character. On the other hand, in the example of FIG. 7(B), the logical HIGH bits are present at $x_{b1}$, $y_{b3}$; $x_{b1}$, $y_{b4}$; $x_{b1}$, $y_{b5}$; $x_{b2}$, $y_{b4}$; $x_{b2}$, $y_{b5}$; $x_{b12l}$, $y_{b5}$; $x_{b3}$, $y_{b6}$; $x_{b4}$, $y_{b1}$; $x_{b4}$, $y_{b2}$; $x_{b5}$, $y_{b1}$; $x_{b5}$, $y_{b2}$; $x_{b5}$, $y_{b3}$; $x_{b6}$, $y_{b2}$; and $x_{b6}$, $y_{b3}$. In this case, logical HIGH bits at $x_{b1}$, $y_{b3}$; $x_{b1}$, $y_{b4}$; $x_{b1}$, $y_{b5}$; $x_{b2}$, $y_{b4}$; $x_{b2}$, $y_{b5}$; $x_{b2}$, $y_{b5}$; and $x_{b3}$, $Y_{b6}$ form a first character component, and the logical bits at $x_{b4}$, $y_{b1}$; $x_{b4}$, $y_{b2}$; $x_{b5}$, $y_{b1}$; $x_{b5}$, $y_{b2}$; $x_{b5}$, $y_{b3}$; $x_{b6}$, $y_{b2}$; and $x_{b6}$, $y_{b3}$ form the second character block component. As will be readily understood, the logical HIGH bits on the vertical scanning line $x_{b3}$ have no connection with the logical HIGH bits on the adjacent $x_{b4}$ scanning line. Therefore, a judgment is made that the first character block component and the second character block component are separated. Namely, in order to detect discontinuity of the components, adjacent bits of the adjacent scanning lines are checked with respect to each bit having a logical HIGH level. In the example of FIG. 7(B), the bit at $X_{b3}$, $y_{b5}$ has no adjacent logical HIGH bit on the $x_{b4}$ vertical scanning line. On the other hand, the bit at $x_{b4}$, $y_{b2}$ also has no adjacent logical HIGH bit on the $x_{b3}$ vertical scanning line. Therefore, separation between the first and second character block components has to be made between the $x_{b3}$ and $x_{b4}$ vertical scanning lines.

Returning to FIG. 6(A), in case of the shown example, no logical HIGH bits are present on the $x_0$ vertical scanning line adjacent to the logical HIGH bits at $x_{(+1)}$, $y_{18}$; $x_{(+1)}$, $y_{19}$; $x_{(+1)}$, $y_{20}$; $x_{(+1)}$, $y_{21}$; and $x_{(+1)}$, $y_{22}$. In addition, discontinuity can be found between the bits of $x_{(+1)}$, $y_6$ and $x_{(+1)}$, $y_{18}$. Therefore, the provisionally segmented character block is separated into two separate blocks at the $x_{(+1)}$ vertical scanning line.

As set forth above, in the second sub-stage 13, the provisionally segmented character block by way of rough segmentation and precise segmentation in the first sub-stage 12 is again segmented into narrower width blocks so as to avoid the impossibility of character recognition due to the presence of more than one character in a single character block.

It will be appreciated that an image reader employed as the document reader 2 employed in the character recognition system tends to be subject to the influence of a modulation transfer function to cause fading at the contour of the character. This affects character block segmentation. In particular, when the text contains alphabetic characters which are arranged in relatively tight spacing, fading of contour of the characters tends to cause segmentation to include more than one character within a single character block. This apparently causes difficulty in character recognition in the character recognition stage 23. According to the preferred embodiment, this difficulty can be resolved by performing separating segmentation of the second sub-stage for separating the character blocks by checking discontinuity of the character or character components in the character block. Therefore, the second sub-stage is advantageously employed in the preferred embodiment of the character recognition system, according to the invention.

It should be appreciated that Kanji characters and Japanese characters contain discontinuities in a single character, even a non-separated character. For instance, in the example of FIG. 5(A), the first Kinja character " 直 " can be separated at components " | " and "匡", though they are not separable for character recognition. Indeed, such separated components of the character will be separated in the second sub-stage 12. However, in the preferred embodiment of the character recognition system, the separated character components can be re-combined by the combining stage 18 which will be discussed later. Therefore, no difficulty in recognizing the character will arise by separating a single character into two or more character components.

Based on the result of the character block separating segmentation performed, secondary character image data $S_6$ is extracted by the second sub-stage 13. The secondary character image data $S_6$ contains image data in the character block defined by separating segmentation in width. The character block defined by the second sub-stage has a height corresponding to the character string height set forth above.

During the aforementioned separating segmentation in the second sub-stage, the segmentation history data is continuously transferred to the history data encoding stage 35 and stored in the data memory 25.

Character Block Segmentation Third Sub-Stage 14

The secondary character image data $S_6$ derived in the second sub-stage 13 is transferred to the third sub-stage. In the third sub-stage, further segmentation is performed for determining the upper and lower edges of the character block at the positions substantially corresponding to the coarse upper and lower contours of each individual character. In order to perform segmentation in the third sub-stage 14, again the y-projection profile $PR_y$ is obtained with respect to each individual character block, as shown in FIG. 8(A). As set forth above, the character block defined by the second sub-stage 13 has a width corresponding to the width $W_x$ of the character or character components and a height $W_{y1}$ corresponding to the character string height. In order to remove noise on the vertical scanning lines, the y-projection profile $PR_y$ is compared with a given threshold level $PR_{th}$. In practice, the threshold level $PR_{th}$ may be determined in relation to the thickness of the line constituting the character. For instance, the threshold level $PR_{th}$ may be set to be about half of the line thickness of the character. As a result of the comparing operation, a modified character block having a width $W_x$ and a height $W_{y2}$ corresponding to the height of the character is be obtained in the third sub-stage.

Therefore, the image data in the modified character block is maintained substantially identical to that contained in the secondary character image data $S_6$ extracted by the second sub-stage, except for the blank bits where only white bits and noise containing bits reside at the upper and/or lower extra areas in the character block segmented by the second sub-stage.

It should be noted that the character block determined in the third sub-stage 14 of the character block segmentation stage 11, forms a basic character block for the character recognition process discussed later. The image data contained in the basic character block will be hereafter referred to as the "basic character image data $S_7$". Generally, the character recognition process is performed utilizing the basic character image data $S_7$ in the character recognition stage 23.

Combining Stage 18

The combining stage 18 is inserted between the character block segmentation stage 11, set forth above, and the character recognition stage 23. The combining stage 18 includes a discriminator stage 20 for discriminating between Kanji or Japanese characters and alphabetic characters. It should be noted that the numeric figures (1, 2, 3 . . . ) and arabic or equivalent characters will be treated as alphabetic characters in the shown embodiment of the character recognition system. The discriminator stage 20 is associated with a switching stage 21. When a determination is made in the discriminator stage 20 that the character to be recognized by the character recognition stage 23 is a Kanji or Japanese character, the switch in the switching stage 21 is connected to a terminal $S_{W1}$ to connect the output of the third sub-stage 14 of the character block segmentation stage 11 to a combiner stage 22. In the combiner stage 22, a combining operation for the basic character blocks is performed in the manner to be discussed later. As a result of the combining operation in the combiner stage 22, the combined image data $S_8$ is fed to the character recognition stage 23. On the other hand, when a determination is made that the character to be recognized is an alphabetic character in the discriminator stage 20, then, the switch of the switching stage 21 is connected to a terminal $S_{W2}$ in order to directly connect the third sub-stage 14 of the character block segmentation stage 11 to the character recognition stage 23. Therefore, in this case, the basic character image data $S_7$ is input to the character recognition stage 23.

The discriminator stage 20 receives from the character recognition stage a signal DTE indicative of the kind of character (Kanji or Japanese character or alphabetic character) being recognized in the character recognition stage 23. With reference to the DTE signal, a switch control signal is produced in the discriminator stage 20 for changing over the switch position in the switching stage 21.

Figures 9, 16:
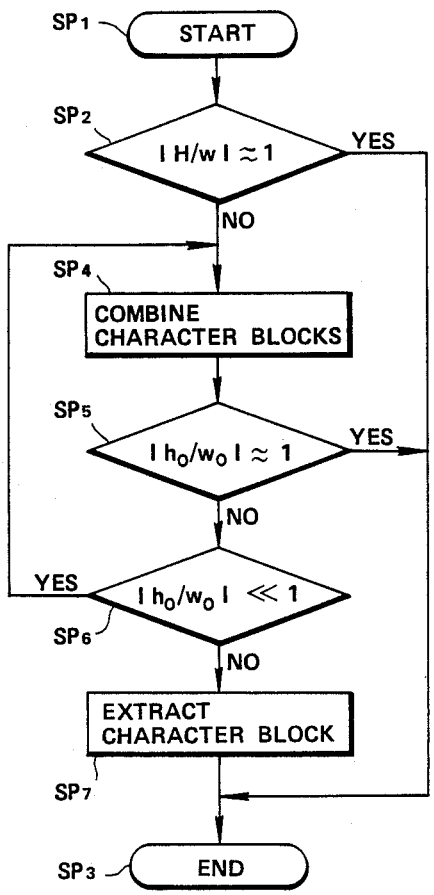
FIG. 9 is a flowchart showing the manner of combining the excised character components during recognition of Japanese or Chinese characters.
FIGS. 15 and 16 are explanatory illustrations showing the excising history data and a diagram thereof.

In the combiner stage 22, a basic character block combining operation takes place in the process illustrated in FIG. 9. The basic character block combining operation is performed based on the general logic that the Kanji and Japanese characters have a certain vertical and horizontal proportion which will be hereafter referred to as the "H/W ratio", and which is substantially or approximately "1". That is, when the basic character block defined by the character block segmentation stage 11 has H/W ratio of approximately 1, a judgment is made that the basic character block contains a single and full-components of a character. On the other hand, when the basic character block defined by the character block segmentation stage 11 has H/W ratio far greater than 1, a judgment is made that the basic character block contains only a character component to be combined with another and subsequent basic character block.

FIG. 9 shows the combining operation process which takes place in the combiner stage 22. The program of FIG. 9 is triggered in response to the basic character image data $S_7$ from the character block segmentation stage 11. After starting the program at a step $SP_1$, the H/W ratio of the basic character block defined by the basic character image data $S_7$ is checked at a step $SP_2$. When the H/W ratio of the basic character block is approximately or nearly 1, then the process goes to END at a step $SP_3$. On the other hand, when the basic character block has a H/W ratio far different from 1 as checked at the step $SP_2$, then, the process is held in a waiting state until the next input of the basic character image data $S_7$ from the character block segmentation stage 11, at a step $SP_4$. The process operation is resumed in response to input of the subsequent basic character image data $S_7$, to combine the last input character image data with the immediately preceding basic character data, at the step $SP_4$. Furthermore, in the step $SP_4$, the width $w_0$ and the height $h_0$ of the combined character block is derived. At a step $SP_5$, the H/W ratio of the newly combined character block is checked utilizing the width $w_0$ and the height $h_0$ derived in the step $SP_4$. When the H/W ratio of the combined character block is approximately or nearly 1, then the process goes to the step $SP_3$ to end the combining program. Therefore, in this case, the combined image data $S_8$ is fed to the character recognition stage 23, which combined image data includes image data of the combined character blocks. On the other hand, if the H/W ratio is still different from 1, the absolute value of the H/W ratio derived based on the width $w_0$ and the height $h_0$ is checked to determine if it is far less than 1, at a step $SP_6$. If so, the process returns to the step $SP_4$ to combine subsequently input other basic character image data. The process in the steps $SP_4$ and $SP_5$ is repeated until the H/W ratio becomes nearly 1, or otherwise, until the H/W ratio becomes greater than 1. When a H/W ratio greater than 1 is detected, as checked at the step $SP_6$, then the process goes to a step $SP_7$ to select the combined character block obtained in the immediately preceding combining operation in the loop of the steps $SP_4$ to $SP_6$ to output it as the combined image data $S_8$. After the step $SP_7$, the process goes to the step $SP_3$ to end the combining process.

Figure 10:
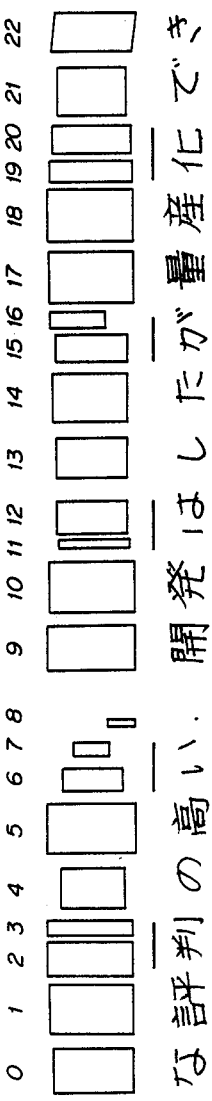
FIGS. 10 and 11 are explanatory illustrations showing the manner of excising Japanese characters and alphabetic characters.

An example of the character block combining operation which takes place in the combining stage 18 will be further explained with reference to FIG. 10. In FIG. 10, the upper rectangular blocks 0 through 22 are character blocks segmented in the third sub-stage 14 of the character block segmentation stage 11, as the basic character blocks. In the basic character blocks of 0 through 22, the character blocks 0, 1, 4, 5, 9, 10, 13, 14, 17, 18, 21 and 22, respectively containing character image data of "￢さ", " ￢〒 ", "の", " ￢き ", " 局ヨ ", "耄", "レ", "￢＿", "￣￡", " ￢￢￣ ", "7￢" and "￢￣ℓ"are judged that they have a H/W ratio approximately 1. On the other hand, the H/W ratio of the character blocks 2, 3, 6, 7, 8, 11, 12, 15, 16, 19 and 20 are smaller than 1. Each of the character blocks 2, 3, 6, 7, 8, 11, 12, 15, 16, 19 and 20 respectively contain character image data of " ￢≠ ", "リ", "ゼ", " ヽ ", " ﾌ ", " ｜ ", " さ ", "ﾂ", "ヽ", "ｲ" and "ﾋ" respectively. In checking the H/W ratio in the step $SP_2$ of the program of FIG. 9, therefore, a judgement will be made that the basic character blocks 2, 3, 6, 7, 8, 11, 12, 15, 16, 19 and 20 contain character components of the separated characters, i.e. " 利 ", "リ", " ｜さ ", " ﾂ﹨ " and " ｲﾋ ". Therefore, the steps $SP_4$ to $SP_6$ are performed to combine adjacent characters, as shown by the underlines on FIG. 10. With respect to the character block 8, a judgement is made that the character block has to be combined with the subsequent character block, at the step $SP_2$. However, after combining this character block 8 with the next character block 9, the H/W ratio becomes greater than 1. Therefore, at the step $SP_7$, the character block 8 is taken as a sole character block containing the character image of ",".

Figure 11:
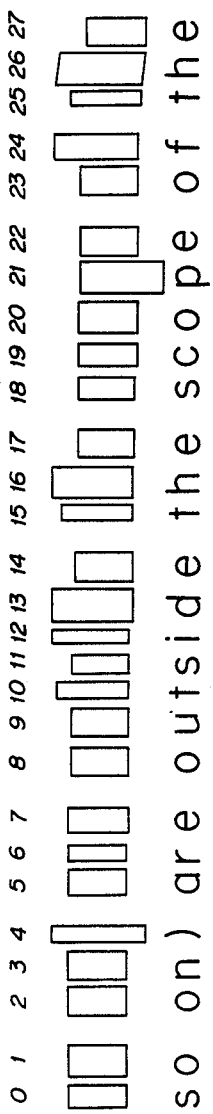

On the other hand, in case of the alphabetic (English) text, as shown in FIG. 11, each character block 0 through 27 has H/W ratio far smaller than 1. However, since the switching stage 21 is operated by the switch control signal from the discriminator stage 20, which signal is produced in response to the DTE signal from the character recognition stage 23, to connect the switch thereof to the terminal $SW_2$, the character block segmentation stage 11 is directly connected to the character recognition stage 23. Therefore, the character blocks 0 through 27, respectively containing character images of "s", "o", "o", "n", ")", "a", "r", "e", "o", "u", "t", "s", "i", "d", "e", "t", "h", "e", "s", "c", "o", "p", "e", "o", "f", "t", "h" and "e", are transferred to the character recognition stage 23 directly from the character block segmentation stage 1, in that order. As set forth, since the alphabetic characters have no separated characters, the combining stage 18 is skipped in transferring the character image data $S_7$ to the character recognition system.

Data Memory 25

The data memory stores various data which can be utilized in the aforementioned character combining operation in the combining stage 18. Each memory address for storing data about the character block has a structure as shown in FIG. 12, for instance. As will be seen from FIG. 12, the memory address of the data memory 25 has a data format including a first data block $DATA_1$ for storing data $D_w$ indicative of the width of the corresponding basic character block, a second data block $DATA_2$ for storing data $D_h$ indicative of the height of the corresponding basic character block, a third data block $DATA_3$ to set/reset flags $FLG_1$, $FLG_2$, $FLG_3$ and $FLG_4$, and a fourth data block $DATA_4$ for storing position data $D_{ps}$, H/W ratio data $D_{vh}$, relative height data $D_{szv}$ and relative width data $D_{szh}$. The first data block $DATA_1$ has 8 bits for storing the 8 bit character block width data $D_w$. Similarly, the second data block $DATA_2$ is constituted by an 8 bit memory block for storing 8 bits of character block height data $D_h$. In the third data block $DATA_3$, each 1 bit of the aforementioned flags $FLG_1$, $FLG_2$, $FLG_3$ and $FLG_4$ are to be set. The flag $FLG_1$ is indicative of segmentation history in the first sub-stage 12 utilizing the lower threshold level $TH_0$. The flag $FLG_1$ is set and reset alternatively every time rough segmentation takes place in the first sub-stage 12. For instance, the flag $FLG_1$ is a logical LOW level ("0") for the first character block and is a logical HIGH level ("1") for the subsequent second character block. Similarly, the flag $FLG_2$ is indicative of the segmentation history in the first sub-stage 12 utilizing the higher threshold level TH$_1$. Namely, the flag FLG$_2$ is set and reset alternatively every time the precise segmentation takes place by the first sub-stage 12. Therefore, similarly, the flag FLG$_3$ is indicative of the segmentation history in the second sub-stages 14 and is alternatively set and reset every time the segmentation takes place in the second sub-stage 13. The flag FLG$_4$ is set when noise-removal is performed utilizing the y-projection profile, in the third sub-stage 14. Further details of the procedure in encoding the segmentation history in the character block segmentation stage will be described later.

The position data D$_{ps}$, the H/W ratio data D$_{vh}$, the relative height data D$_{szv}$ and the relative width data D$_{szh}$ are respectively 2 bit data to be stored in the 8 bit fourth data block DATA$_4$. The relative height data D$_{szv}$ indicates the relative height of the basic character block relative to a standard basic character block height h$_R$. Similarly, the relative width data D$_{szh}$ indicates the relative width of the basic character block relative to a standard basic character block width W$_R$.

The character block width data D$_w$ is derived by the parameter encoder stage 30 which will be described later, relative to the character block segmented in the second sub-stage 13 in the character block segmentation stage 11. In practice, the width of the character block segmented in the second sub-stage 13 is detected by the H/W ratio and the character size detector stage 31 in the parameter encoder stage 30. The character block height data D$_h$ is also derived by the parameter encoder stage 30, particularly by the H/W ratio and the character size detector stage 31, with respect to the basic character block segmented by the third sub-stage 14 of the character block segmentation stage 11. The H/W ratio and character size detector stage 31 in the parameter encoder stage 30 also determine the H/W ratio based on the character block width and the character block height derived as set forth above. The H/W ratio data D$_{vh}$ is then stored in the fourth data block DATA$_4$. Furthermore, the H/R ratio and character size detector stage 31 derives the relative character width data D$_{szh}$ and the relative character height data D$_{szv}$ by comparing the derived character width and character height with standard width and height s$_R$ and h$_R$, respectively. As set forth above, these relative character width data D$_{dzh}$ and relative character height data D$_{szv}$ are also stored in the fourth data block DATA$_4$.

The relative character width data D$_{szh}$ and the relative character height data D$_{szv}$ are utilized for distinguishing small and large letters having identical character patterns. For instance, in the Japanese characters, there are different sizes of characters of identical character patterns, such as "ツ" and "ッ"; "ヨ" and "ョ"; and "ヤ" and "ャ". Among these, the respective characters have identical character patterns but one has a smaller size than the other which has a normal character size. Such characters which have an identical character pattern, but which are smaller than normal in size, serve as a syllabic nasal in Japanese text, and will be hereafter referred to as a "small character". Because of the presence of such small characters in Japanese, it becomes necessary to distinguish such small characters from the normal size characters. The relative character width data D$_{szh}$ and the relative character height data D$_{szv}$ are necessary for enabling the character recognition stage to distinguish the small characters from the corresponding normal size characters. Furthermore, this size factor will become necessary for distinguishing small letters and capital letters of essentially identical character patterns of alphabetic characters, such as "C" and "c", "S" and "s", "Z" and "z" and so forth.

The position data D$_{ps}$ is representative of the position of the character within a standard character block P$_R$ having standard width w$_R$ and standard height h$_R$, as shown in FIG. 14. Namely, in the shown embodiment, the position data D$_{ps}$ is representative of whether the character occupies the upper region P$_{RU}$ or the lower region P$_{RL}$ of the standard character block P$_R$. The first bit of the two bit position data D$_{ps}$ becomes a logical HIGH level ("1") when the upper region P$_{RU}$ is occupied by the character and becomes a logical LOW level ("0") otherwise. Similarly, the second bit of the two bit position data D$_{ps}$ becomes a logical HIGH level ("1") when the lower region P$_{RL}$ is occupied by the character and becomes a logical LOW level ("0") otherwise. Therefore, when the position data D$_{ps}$ is a "1, 1", it indicates that the character occupies both of the upper and lower regions P$_{RU}$ and P$_{RL}$. If the position data D$_{ps}$ is a "1, 0", it indicates that the character occupies only the upper region P$_{RU}$ of the standard character block P$_R$. Such character will be dash ('), degree (°,), superscript letters and so forth. On the other hand, if the position data D$_{ps}$ is a "0, 1", it indicates that the character occupies only the lower region P$_{RL}$ of the standard character block P$_R$. Such characters will be period (.), comma (,), Japanese end mark (o), Japanese bressing mark (), sub-script letters and so forth. The characters occupying only the upper or lower regions P$_{RU}$ or P$_{RL}$ of the standard character bloc P$_R$ are special characters. Since the number of such special characters is limited, recognition of such special characters can be performed utilizing special and simplified character recognition algorithms different from those for recognition of normal characters. Therefore, the position data D$_{ps}$ is used for detecting such special characters.

Segmentation History Encoding Stage 35

As briefly set out in the former section, the segmentation history encoding stage 35 controls the setting and resetting of the flags FLG$_1$, FLG$_2$, FLG$_3$, FLG$_4$ which are set/reset in the third data block DATA$_3$ of the data memory. As set forth above, such flags FLG$_1$, FLG$_2$, FLG$_3$ and FLG$_4$, indicate the history of segmentation performed in the character block segmentation stage 11, in combination. Since a separate bit is provided for setting and resetting each of the flags FLG$_1$, FLG$_2$, FLG$_3$ and FLG$_4$, the segmentation history is indicated by a four bit binary code. The process for encoding the segmentation history will be discussed with reference to FIG. 15.

Figure 15:
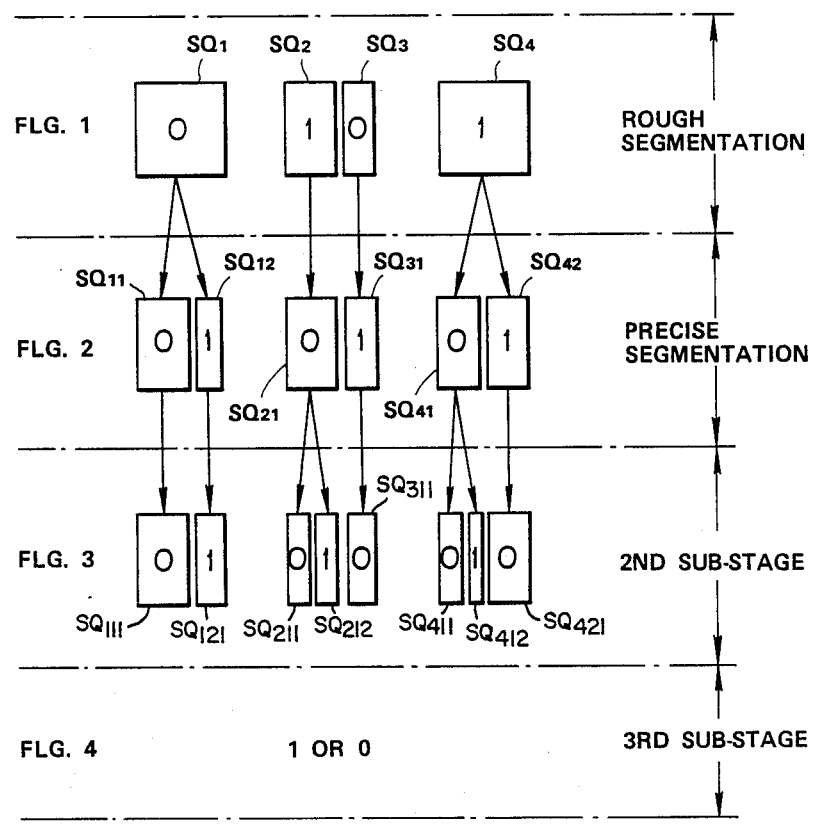

As shown in FIG. 15, while character block segmentation is performed in the first sub-stabe 12 utilizing the lower threshold level TH$_0$, the value of the flag FLG$_1$ for the respective character blocks SQ$_1$, SQ$_2$, SQ$_3$, SQ$_4$ . . is set alternatively to "0", "1", "0" "1" . . . . Therefore, in this example, for the character blocks SQ$_1$, SQ$_3$ . . . segmented in odd cycles of segmentation operation, the flag FLG$_1$ is set to "0" and for the character blocks SQ$_2$, SQ$_4$ . . . segmented in even cycles of segmentation operation, the flag FLG$_1$ is set to "1". Similarly, while character block segmentation is performed in the first sub-stage 12 utilizing the higher threshold level TH$_1$, the value of the flag FLG$_2$ for respective character blocks SQ$_{11}$, SQ$_{12}$, SQ$_{21}$, SQ$_{31}$, SQ$_{41}$, SQ$_{42}$ . . . is set alternatively as "0", "1", "0", "1" "0", "1".

Therefore, in this example, the character blocks SQ$_{11}$, SQ$_{21}$, SQ$_{41}$ . . . segmented in odd cycles of segmentation operation set the flag $FLG_2$ to "0" and the character blocks $SQ_{12}$, $SQ_{31}$, $SQ_{42}$ . . segmented in even cycles of segmentation operation set the flag $FLG_2$ to "1". As will be seen from FIG. 15, the character blocks $SQ_{11}$, $SQ_{12}$ and $SQ_{41}$ and $SQ_{42}$ are separated into two character blocks in precise segmentation from respective single character blocks $SQ_1$ and $SQ_4$ as segmented in the rough segmentation.

The flag $FLG_3$ is set/reset according to the order of segmentation performed in the second sub-stage 13. In the shown example, the character blocks $SQ_{111}$, $SQ_{121}$, $SQ_{211}$, $SQ_{212}$, $SQ_{311}$, $SQ_{411}$, $SQ_{442}$, $SQ_{421}$ . . . are segmented in the second sub-stage 13. The flag $FLG_3$ is respectively set to "0", "1", "0", "1", "0", "1", "0" . . . for the character blocks $SQ_{111}$, $SQ_{121}$, $SQ_{211}$, $SQ_{212}$, $SQ_{311}$, $SQ_{411}$, $SQ_{412}$, $SQ_{421}$. As will be seen the character block $SQ_{21}$ segmented in the precise segmentation is divided into two separate character blocks $SQ_{211}$ and $SQ_{212}$. Also, the character block $SQ_{41}$, originally segmented as single character block with the character block $SQ_{42}$ in rough segmentation in the first sub-stage 12, and separated from the character block $SQ_{42}$ in the precise segmentation in the first sub-stage, is again separated into the character blocks $SQ_{411}$ and $S_{412}$ in the second sub-stage 13.

As set forth above, the flag $FLG_4$ is set and reset depending upon whether segmentation to remove the noise-containing area in the character block derived in the second sub-stage 13, is performed or not in the third sub-stage 14. Namely, when some are is removed from the character block to form the basic character block in the third sub-stage, the flag $FLG_4$ is set to a logical HIGH level ("1"). Otherwise, the flag $FLG_4$ is set to a logical LOW level ("0").

Therefore, during segmentation in the first through third sub-stages 11, 12 and 13 of the character block segmentation stage 11, flags $FLG_1$, $FLG_2$, $FLG_3$ and $FLG_4$ are set in the third data block DATA3 of each memory address in the data memory 25. The flags $FLG_1$ through $FLG_4$ in the data memory 25 indicate the segmentation history of the respective basic character blocks to be recognized by the character recognition stage 23. In particular, the flags $FLG_1$, $FLG_2$ and $FLG_3$ are combined to show the history of segmentation with respect to the character blocks $SQ_{111}$, $SQ_{121}$, $SQ_{211}$ . . . . In other words, by checking the combined flags $FLG_1$, $FLG_2$ and $FLG_3$, how the character blocks are derived can be recognized.

FIG. 16 shows the combined values of the flags $FLG_1$, $FLG_2$ and $FLG_3$ set with respect to the character blocks $SQ_{111}$, $SQ_{121}$, $SQ_{211}$, $SQ_{212}$, $SQ_{311}$, $SQ_{411}$, $SQ_{412}$, $SQ_{421}$. As set forth above, the combined flags $FLG_1$, $FLG_2$, and $FLG_3$ indicate the segmentation history of the corresponding character block. Namely, when the segmentation history is checked, the logical levels of the same flag of the succeeding character blocks are checked. For instance, with regard to the succeeding character blocks $S_{11}$ and $SQ_{111}$, the logical levels of the flag $FLG_1$ are both "0". This means that the character blocks $SQ_{111}$ and $SQ_{121}$ are segmented as a single character block in the rough segmentation performed in the first sub-stage 12 of the character block segmentation stage 11. In checking the flag $FLG_2$ with respect to the character blocks $SQ_{111}$ and $SQ_{121}$, the respective logical levels are "0" and "1". This means that the character blocks $SQ_{111}$ and $SQ_{121}$ are segmented as separate character blocks in the precise segmentation in the first sub-stage 12. From these results, it should be recognized that the character blocks $SQ_{111}$ and $SQ_{121}$ were regarded as a single character block when segmented utilizing the low threshold level $TH_0$. This means there is a possibility that a single character has been separated into two character components in the precise segmentation. This, in turn, means that the character blocks $SQ_{111}$ and $SQ_{121}$ can be combined to form an image data to be recognized in the character recognition stage 23 by the combining stage 18.

On the other hand, with regard to the character blocks $SQ_{121}$ and $SQ_{211}$, the respective logical levels of the flag $FLG_1$ are "0" and "1". This means that these two character blocks $SQ_{121}$ and $SQ_{211}$ are originally segmented as separated blocks in the rough segmentation. From this result, it can be judged that the characters contained in the character blocks $SQ_{121}$ and $SQ_{211}$ are different and separate characters and thus should not be combined in the combining stage 18.

In the same manner, a judgment can be made with respect to the character blocks $SQ_{411}$, $SQ_{412}$ and $SQ_{421}$. In checking the flag $FLG_1$, the respective logical levels are "1". Therefore, it is found that all of these three character blocks $SQ_{411}$, $SQ_{412}$ and $SQ_{421}$ were originally segmented as a single character block $SQ_4$ in FIG. 15. This suggests the possibility of combining these three character blocks in the combining stage 18 for forming a single character image for character recognition. In checking the flag $FLG_2$ of the character blocks $SQ_{411}$, $SQ_{412}$ and $SQ_{421}$, the logical levels thereof are respectively "0", "0" and "1". From this, it can be recognized that the character blocks $SQ_{411}$ and $SQ_{412}$ are segmented as a single character block even in the precise segmentation in the first sub-stage 12. On the other hand, it is also recognized that the character blocks $SQ_{412}$ and $SQ_{421}$ are segmented as separate character blocks in the precise segmentation. Though the character blocks $SQ_{411}$ and $SQ_{412}$ are separated into two character blocks in the precise segmentation, there is a possibility that each of these character blocks contain character components to be combined. Therefore, the character blocks $SQ_{411}$ and $SQ_{412}$ can also be combined in the combining stage 18 set forth above.

With regard to the character block $SQ_{311}$, there is no common logical level to the succeeding character blocks $SQ_{212}$ and $SQ_{411}$ as observed in FIG. 16. This means that the character in the character block $SQ_{311}$ is an independent and separate character with respect to the characters in the character blocks $S_{212}$ and $SQ_{411}$. Therefore, recognition of the character for the character block $SQ_{311}$ is performed solely with respect to the character in the character block $SQ_{311}$.

As previously explained, the flag $FLG_4$ indicates whether some area in the character block is removed in the segmentation performed in the third sub-stage 14. Therefore, the overall segmentation history data $D_{hs}$ is useful in controlling the combining operation performed in the combining stage 18 set forth above and the re-segmentation operation in the re-segmentation stage 40 which will be described later.

So as to alternatively set the logical level "0" and "1" for the respective flags $FLG_1$, $FLG_2$, $FLG_3$ and $FLG_4$, in the segmentation history encoding operation taking place in the history data encoding stage 35, the memory address corresponding to the character block is accessed. In the accessed memory address, each bit for storing the flags $FLG_1$, $FLG_2$, $FLG_3$ and $FLG_4$ is accessed in order according to the advance of the character segmentation taking place in the first, second third sub-stages 12, 13 and 14 of the character block segmentation stage 11.

Character Recognition Stage 23

Figure 17:
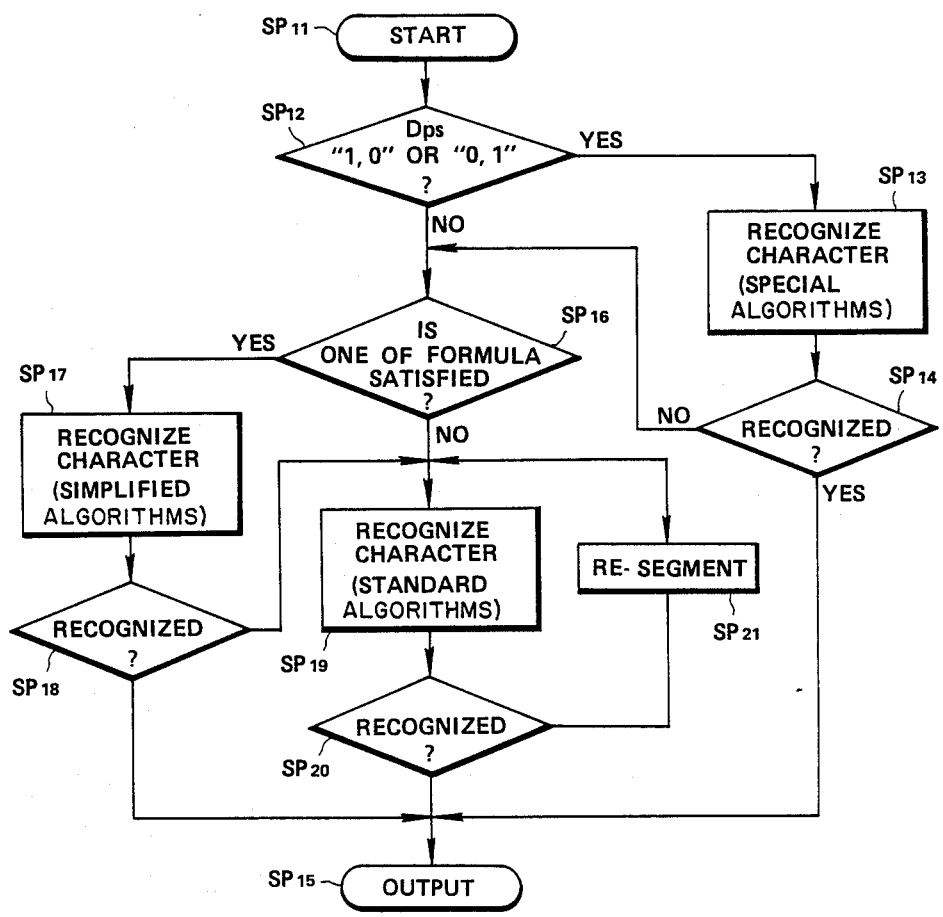
FIG. 17 is a flowchart showing the character recognition procedure performed by the character recognizing stage.

In the character recognition stage 23, character recognition for the character image data $S_7$ and $S_8$ transmitted from the combining stage 18 is carried out accordig to the process shown in FIG. 17. So as to perform the character recognition process effectively, both the character image data $S_7$ and $S_8$ and the data stored in the data memory 25 set forth above are utilized in the process of character recognition in the character recognition stage.

In the process of FIG. 17, immediately after starting the process at a step $SP_{11}$, the fourth data block $DATA_4$ of the corresponding memory address is checked at a step $SP_{12}$. Especially, the position data $D_{ps}$ is checked whether the character to be recognized is a special character, such as "''", "''''", "—(Chinese character indicative of 'one')", "°" positioned at upper half $P_{RU}$ of the standard character block PR, or "。" (Japanese stop-mark), ".", ",", "フ" positioned at the lower half $P_{RL}$ of the standard character block $P_R$. Therefore, in the step $SP_{12}$, a check is performed whether the position data $D_{ps}$ is "1, 0" or "0, 1". Namely, when the position data $D_{ps}$ is "1, 0", it indicates that the character is a special character to be positioned in the upper half $P_{RU}$ of the standard character block $P_R$. Similarly, when the position data $D_{ps}$ is "0, 1", it indicates that the character is a special character to be positioned on the lower half $P_{RL}$ of the standard character block $P_R$. When a judgment is made that the character to be recognized is one of the special characters, then the process goes to a step $SP_{13}$.

In the step $SP_{13}$, special algorithms for recognizing the special character are used for performing recognition of the character. Preferably, algorithms for recognition of the special characters to be placed in upper half $P_{RU}$ are different from those used for the special characters to be positioned in the lower half $P_{RL}$. The special algorithms to recognize the special or specific characters are per se well known.

After the character recognition process in the step $SP_{13}$, a check is performed whether the character is recognized, at a step $SP_{14}$. When the character recognized in the step $SP_{13}$ is confirmed, then the process goes to a step $SP_{15}$ to output the result. The output $S_{10}$ of the character recognition stage 23 as output at the step $SP_{15}$ may be a per se well known character code, such as an ASCII code or so forth. The output $S_{10}$ in the form of a character code, will be hereafter referred to as the "character code data $S_{10}$".

As set forth, by utilizing the position data $D_{ps}$ for distinguishing the special characters from the normal characters, special and simplified algorithms can be utilized in the step $SP_{13}$ for reducing the time required for recognizing the characters.

On the other hand, when the character to be recognized is a normal character, the character segment will occupy both of the upper and lower halves $P_{RU}$ and $P_{RL}$ of the character block $P_R$. Therefore, the position RD of data $D_{ps}$ indicative of the normal character becomes "1, 1". When the position data $D_{ps}$ has a logical HIGH level "1" at both bits, then a judgment is made that the character to be recognized is not one of the special characters, at the step $SP_{12}$. Then, the process goes to a step $SP_{16}$. Also, when the character cannot be recognized in the step $SP_{13}$ and the impossibility of recognition is detected at the step $SP_{14}$, the process also goes to the step $SP_{16}$. In the step $SP_{16}$, the H/W ratio data, the relative height data $D_{szv}$, and the relative width data $D_{szh}$ in the fourth data block $DATA_4$ of the corresponding memory address of the data memory 25, are checked. Therefore, in this step $SP_{16}$, the vertical/horizontal proportion and the size of the character are checked so as to judge whether the character to be recognized is a character having a particular H/W ratio or a particular character size.

In the preferred embodiment, in order to check whether the character to be recognized has the particular H/W ratio, a check is performed whether $$0 < H/w < 0.5 \quad (1)$$

is satisfied, or $$1.5 < H/w \quad (2)$$

is satisfied.

The characters to satisfy the foregoing formula are "=", "—", "→", "←", "~" and so forth, for example. On the other hand, the characters to satisfy the formula (2) are ":", ";", "0" to "9", "っ", "〈", "ぐ", "ξ", "ト", "I", "f", "i" and so forth, for example.

In order to check whether the character to be recognized has a particular size, the relative height data $D_{szv}$ ($h/h_R$: h is a height of the character block; and $H_R$ is a height of the standard character block) is checked to determine whether $$0 < D_{szv} < 0.5 \quad (3)$$

is satisfied or not. The characters to satisfy the formula (3) are "mm", "cm", "。" (Japanese stop-marks), "フ", "ヅ", "/\", "ヘ", "a", "e", "C", "T" and so forth, for example.

Furthermore, in order to check whether the character to be recognized has a particular size, the relative width data $D"szh"$ ($w/w_R$: w is a width of the character block; and $w_R$ is a width of the standard character block) is checked to determine whether $$0 < D_{szh} < 0.5 \quad (4)$$

is satisfied. The characters to satisfy this formula (4) are "'", "''", "。" (Japanese stop-mark), ":)", ";", "0" to "9", "ラ", "〈", "イ", "a", "c", "e" and so forth, for example.

When the character to be recognized has the particular height/width proportion or particular character size satisfying one of the formula (1) to (4), the process goes to a step $SP_{17}$ to perform character recognition utilizing algorithms which are simpler than those utilized for character recognition of normal characters. Since the characters satisfying one of the foregoing formula are strictly limited, the algorithms to be utilized for such characters are significantly simplified. Therefore, the time required for recognizing the character can be shortened. After the character recognition process at the step $SP_{17}$, a check is performed of whether the character is recognized during the process in the step $SP_{17}$. When recognition of the character is confirmed in the step $SP_{18}$, then the process goes to the step $SP_{15}$ to output the character code data $S_{10}$.

On the other hand, when the character to be recognized does not satisfy any one of the aforementioned formula (1) to (4) as checked at the step $SP_{16}$, the process goes to a step $SP_{19}$ to perform character recognition utilizing a standard algorithm. Similarly, when the character cannot be recognized in the step $SP_{17}$ and the impossibility of recognition of the character is detected at the step $SP_{18}$, the process also goes to the step $SP_{19}$. In the character recognition process in the step $SP_{19}$, the character image data is compared with standard character data which is preset in the character recognition system. When the character image data substantially match the preset standard character data, the character is recognized as the character represented by the preset standard character data. Recognition of the character is confirmed by a step $SP_{20}$. Based on the result of the character recognition in the step $SP_{20}$, the character code data $S_{10}$ is output at the step $SP_{15}$.

On the other hand, when the character image data $S_7$ or $S_8$ does not match with any of the standard character data, the impossibility of the character recognition is detected in the step $SP_{20}$. In this case, re-segmentation is performed at a step $SP_{21}$. The re-segmentation in the step $SP_{21}$ includes re-combination of the character blocks and re-separation of the character blocks. During this re-segmentation process in the step $SP_{21}$, the history data $D_{hs}$ set in the form of flags $FLG_1$, $FLG_2$, $FLG_3$ and $FLG_4$ of the third data block $DATA_3$ of the corresponding memory address in the data memory 25 is utilized as described above. After the re-segmentation process is performed in the step $SP_{21}$, the process returns to the step $SP_{19}$ to perform character recognition utilizing the standard algorithms in the step $SP_{19}$.

It should be appreciated that the re-segmentation of the character block which cannot be recognized in the step $SP_{19}$ enables the system to effectively perform re-segmentation utilizing the history data. With this process, the rate of recognition of the characters can be significantly raised or improved.

Operation of the Overall Character Recognition System

As set forth above, in the preferrred embodiment of the character recognition system according to the invention, the document image picked up by the document reader 2 is transferred to the area segmentation stage 3. In the area segmentation stage, skew-normalization and noise elimination is performed in addition to segmentation for the character strings $AR_1$, $AR_2$... as shown in FIG. 2.

The manner of skew normalization and noise elimination has been disclosed in "IEEE", CH2145-1/85/0000/055, published on 1985, pages 550 to 557. The disclosure in this publication is herein incorporated by reference.

In the area segmentation stage 3, the segmentation process starts from defining the text area in the document image data from the document reader. Then, the character string blocks are segmented based on the y-projection profile of the text area. Namely, in the area segmentation process, horizontal scanning lines containing the character image data are selected for further character recognition processing and whereby the character image data is extracted. Therefore, the area-segmentation data $S_4$ contains the image data on the horizontal scanning lines in each of the segmented character strings.

The area-segmentation data $S_4$ is transferred to the character recognition stage 7. Character block segmentation is performed by the character block segmentation stage 11 in the character recognition stage 7. In the character block segmentation stage 11, provisional character block segmentation is performed in the first sub-stage 12 based on the x-projection profile. In the provisional character block segmentation in the first sub-stage 12, rough segmentation utilizing the lower threshold level $TH_0$ and precise segmentation utilizing the higher threshold level $TH_1$ are performed. During this rough segmentation, the flag $FLG_1$ in the third data block $DATA_3$ of the corresponding memory address is alternatively set at logical levels "0" and "1" in that order. Similarly, during the precise segmentation, the flag $FLG_2$ in the third data block $DATA_3$ of the corresponding memory address is alternatively set at logical levels "0" and "1" in that order.

The character image data extracted by the precise segmentation in the first sub-stage 12 is transferred to the second sub-stage. In the second sub-stage, continuity of the character in the provisionally segmented character block is checked relative to the x-projection profile. When discontinuity is found in the characters or character components in the character block, the discontinuing characters or character components are separated into separate character blocks. In this process, the flag $FLG_3$ in the third data block $DATA_3$ of the corresponding memory address is alternatively set at logical levels "0" and "1" in that order. The character image data extracted in the second sub-stage 13 is processed in the third sub-stage 14. In the third stage, the height of the character block is modified so that the upper and lower horizontal edges of the character blocks lie substantially adjacent the upper and lower contours of the character. This process is performed by checking the y-projection profile of the character in the character block. At the same time, vertically aligned noise is removed from the character image data by comparing the y-projection profile with the given threshold level.

During this process in the third sub-stage 14, the flag $FLG_4$ in the third data block $DATA_3$ is set in the logical level "0" or "1" depending upon the result of comparing operation of the y-projection profile with the threshold level. For instance, when any area of the character block is removed as a result of comparing operation, the flag $FLG_4$ is set in the logical HIGH level "1" and otherwise set in the logical LOW level "0".

Therefore, in the character block segmentation stage 11, the basic character blocks have edges located at the upper, lower and side contours of the character in the character block. Though the character blocks are segmented to finally obtain the basic character block through the first, second, and third sub-stages 12, 13 and 14, the character image data contained in the character block is maintained for showing the particulars of the character therein.

Fundamentally the basic character block is segmented into a minimum block to contain a minimum size character unit image so as to assure recognition of characters by combining two or more character blocks and avoid the possibility of failure of recognition caused by containing more than one character in a single character block. During the character block segmentation performed in the character block segmentation stage 11, data indicative of the segmentation history is stored in the data memory 25 in the form of flags $FLG_1$, $FLG_2$, $FLG_3$ and $FLG_4$. Furthermore, in the data memory, data $D_w$ indicative of the width of the corresponding basic character block in the first data block $DATA_1$, data $D_h$ indicative of the height of the corresponding basic character block in the second data block DATA$_2$, position data D$_{ps}$, H/W ratio data D$_{vh}$, relative height data D$_{szv}$ and width data D$_{szh}$ in the fourth data block DATA$_4$. These data in the data memory are useful for effectively performing combining of character blocks in the combining stage 18 and character recognition in the character recognition stage 23.

Thus, the segmentation history indicative flags FLG$_1$, FLG$_2$, FLG$_3$ and FLG$_4$ are useful for combining character blocks for the character blocks containing character components whereas the position data D$_{ps}$, H/W ratio data D$_{vh}$, relative height data D$_{szv}$ and relative width data D$_{szh}$ are useful for detecting special characters which can be recognized utilizing simplified algorithms. By distinguishing the particular characters from other normal characters which require a character recognition process utilizing normal or standard algorithms, the number of characters to be recognized by utilizing the standard algorithms is reduced to shorten the time required for recognition of the text.

It should be appreciated that character recognition in the character recognition stage 23 is generally performed in a per se well known process. For example, character recognition can be performed according to the algorithms disclosed in "CLASSIFICATION OF MIXED FONT ALPHAETICS BY CHARACTERISTIC LOCI" written by Herbert A. Glucksman et al. and published in "DIG FIRST IEEE COMPUTER CONFERENCE, 1967". Disclosure of the aforementioned publication is herein incorporated by reference.

It should be appreciated that although the preferred embodiment employs a re-segmenting stage and a re-combining stage for re-segmenting and re-combining the character blocks for assuring recognition of the characters, the preferred embodiment of the invention should be applicable for any character recognition system which requires segmentation of character blocks. Especially the character block segmentation technic employed in the preferred embodiment of the invention would be useful in any type of character recognition systems. Furthermore, utilizing the segmentation history data in the character recognition process assures character recognition in any of the character recognition systems. Therefore, character recognition systems employing the segmentation techniques as set out in the appended claims would be regarded as within the scope of the invention.

Furthermore, the segmentation history data indicated by the flags can be utilized for controlling re-segmentation to be performed when character recognition fails with respect to the character block.

Though the specific embodiment has been discussed with reference to the accompanying drawings, the present invention can be implemented in various ways. For example, although the shown embodiment has been disclosed with an example of character recognition for a text with the horizontally extending character strings, character recognition can be performed for a text with vertically extending character strings. Also, the content of the data memory 25 can be utilized not only for controlling combining of character blocks, character recognition and re-segmentation of the character blocks, but also for other processes. Furthermore, in the shown embodiment, character block segmentation in the first sub-stage of the character block segmentation stage is performed with different levels of thresholds. Similar effects can be obtained by repeatedly segmenting the identical character string block.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A character recognition system for reading character image data from a document comprising:

optical scanning means for scanning the document to obtain a video signal containing image data from said document;

extracting means for extracting character blocks from the video signal, wherein each character block contains image data of individual characters from said document, said extracting means further producing predetermined history data of each character block indicative of the process of extraction of said character block;

combining means for comparing ratios of predefined dimensional attributes of each character block with predetermined standard ratios and selectively re-combining two or more of the extracted character blocks based on such comparison in order to form a combined character block;

character recognition means for receiving the extracted character blocks and the recombined character blocks for performing character recognition according to predetermining algorithms and outputting a signal indicative of a recognized character; and encoding means connected to said extracting means to obtain the extraction history data, for controlling the operation of said combining and character recognition means by means of the extraction history data in such a manner that when said character recognition means fails to recognize a character in said character block, said encoding means selectively causes said combining means to successively combine character blocks until said character recognition means recognizes the character in said character block formed by said combining means.

2. A character recognition system as set forth in claim 1, further comprising means for distinguishing between alphabetic characters and kanji, hiragana, and katakana characters.

3. A character recognition system as set forth in claim 1, wherein said extracting means extracts said character block in predetermined minimum character units.

4. A character recognition system as set forth in claim 3, wherein said extracting means defines a character area of each character block to have edges thereof striking upper, lower and side contours of said minimum character unit.

5. A character recognition system as set forth in claim 3, wherein said extracting means detects any overlap between adjacent individual characters for separately forming said character blocks for each individual character.

6. A character recognition system as set forth in claim 5, wherein said extracting means removes noise components in said character image data for each of said character blocks.

7. A character recognition system as set forth in claim 1, wherein said extracting means includes a plurality of stages for extracting said character blocks from said image data, and said history data includes data indicative of the extraction process at each of said plurality of character block extraction stages.

8. A character recognition system as set forth in claim 7, wherein said optical scanning means scans the document along horizontal and vertical lines and said extracting means includes a stage for segmenting the image data into separate character-string blocks, a stage for segmenting each character-string block into separate character blocks, and a stage for detecting overlapping character units in a single character block and separating said character block into two or more character blocks, each containing a different one of the overlapping character units.

9. A character recognition system as set forth in claim 8, wherein said segmentation stages output signals indicative of the height and width of each character block and the combining means is supplied with these character block height and width signals and uses them to determine whether or not a given character block contains only a character component which must be combined with another and subsequently segmented character block to yield a complete character.

10. A character recognition system as set forth in claim 9, wherein said combining means computes the ratio of the character block height to the character block width and, if the ratio is much greater than 1, it combines the next received character block from the segmentation means with the last received character block, recomputes the height to width ratio of the combined character block, compares this ratio with 1, repeats this process until the height to width ratio is approximately one, and then outputs the last combined character block.

11. A character recognition system as set forth in claim 9, wherein said character recognition means further comprises predetermined character detection means for detecting a predetermined character and controlling the character recognizing operation of said character recognition means for said predetermined character by selecting an auxiliary algorithm, which is simpler than the predetermined algorithms, for performing character recognition of the predetermined character.

12. A character recognition system as set forth in claim 11, wherein said encoding means is supplied with said character block height and width signals, compares the character block height and width to predetermined standard heights and widths and from this comparison, generates relative character block height and width signals, wherein said segmentation means detects whether the character is in the upper or the lower half of the character block and outputs a position data signal, and further wherein said predetermined character detection means is supplied with the character block height, width, relative height, relative width, and data position signals and uses said signals to determine if the character is said predetermined character and, if so, selects one of said auxiliary algorithms.

13. A character recognition system as set forth in claim 8, wherein said character-string segmentation stage checks the level of a y-projection profile of the document image data for selecting horizontal scanning lines from the optical scanning means to be included in each of said character-string blocks.

14. A character recognition system as set forth in claim 8, wherein said character block segmentation stage checks the level of an x-projection profile of the document image data with respect to a predetermined threshold level for selecting vertical scanning lines of said optical scanning means to be included in said character block.

15. A character recognition system as set forth in claim 14, wherein said character block segmentation stage, in checking the level of the x-projection profile, employs a plurality of mutually different threshold levels to obtain different levels of precision in segmenting the character blocks into minimum character units.

16. A character recognition system as set forth in claim 8, wherein said overlapping character unit detecting stage checks the continuity of the character units contained in said character block for detecting discontinuities in the character units.

17. A character recognition system as set forth in claim 16, wherein said overlapping character unit detecting stage checks the continuity between adjacent image data containing bits for detecting discontinuity of the character unit in said character block.

18. A character recognition system as set forth in claim 8, wherein said extracting means further comprises a stage for checking the level of a y-projection profile for the character image data in said character block for modifying the height of said character block so that the upper and lower edges of said character block strike the upper and lower contours of said character unit in said character block.

19. A character recognition system comprising:
scanning means for obtaining a video signal containing image data of said document;
extracting means, which is supplied with the video signal, for segmenting said image data into character blocks, each of which contains image data of an individual character unit, and outputting a corresponding character block signal, said extracting means including a plurality of segmentation stages including a first segmentation stage for segmenting character-string blocks and a second segmentation stage for segmenting each character-string block into separate character blocks each containing character image data of a character unit and wherein said first and second stages further output segmentation history data indicative of the manner in which each character-string block and character block have been segmented;
combining means, which is supplied with the character block signal, for selectively recombining two or more character blocks to form a combined character block and outputting a combined character block signal;
character recognition means, which is selectively supplied with either the character block signal or the combined character block signal, for performing character recognition according to predetermined algorithms and outputting a "recognized character" signal;
re-segmenting means, which is supplied with the character block signal and the combined character block signal, for re-segmenting a selected character block for forming a re-segmented character block; and
encoding means connected to said extracting means and supplied with the segmentation history data with respect to each of said character blocks segmented by said extracting means, for controlling the operation of said combining, re-segmentation and character recognition means based on said segmentation history data in such a manner that said encoding means selectively operates one of said combining and re-segmenting means when said character recognition means fails to recognize a character in said character block, so as to recombine or re-segment, respectively, one or more selected character blocks to assure recognition in said character recognition means of the character block formed by a selected one of said combining and re-segmenting means.

20. A character recognition system as set forth in claim 19, wherein said extracting means extracts said character block in minimum character units.

21. A character recognition system as set forth in claim 19, wherein said extracting means further comprises a third segmentation stage for detecting overlap between adjacent separable character units contained in a single character block for separately forming said character blocks for each of the respective character units.

22. A character recognition system as set forth in claim 19, wherein said extracting means further comprises a fourth segmentation stage for removing noise components in said character image data for each of said character blocks.

23. A character recognition system as set forth in claim 19, which further comprises predetermined character detection means for detecting a predetermined character and controlling the character recognizing operation of said character recognition means for said predetermined character by selecting an auxiliary algorithm which is simpler than the predetermined algorithms.

24. A character recognition system as set forth in claim 21, wherein said scanning means scans the document along horizontal and vertical lines and said first segmentation stage checks the level of a y-projection profile of the document image data for selecting horizontal scanning lines from the scanning means to be included in each of said character-string blocks.

25. A character recognition system as set forth in claim 21, wherein said second segmentation stage checks the level of an x-projection profile of the document image data with respect to a predetermined threshold level for selecting vertical scanning lines from the scanning means to be included in said character block.

26. A character recognition system as set forth in claim 25, wherein said second segmentation stage employs a plurality of mutually different threshold levels for segmenting said character block at different levels of precision in segmenting the character blocks into minimum character units.

27. A character recognition system as set forth in claim 26, wherein said third segmentation stage checks the continuity of the character unit contained in each character block for detecting discontinuity in the character unit in order to separate the character block into two or more character blocks.

28. A character recognition system as set forth in claim 26, wherein said third separating stage checks the continuity between adjacent image data containing bits for detecting discontinuity of the character unit in each said character block.

29. A character recognition system as set forth in claim 22, wherein said encoding means obtains the segmentation history data with respect to each character block in said respective second, third and fourth segmentation stages.

30. A character recognition system comprising: scanning means for obtaining a video signal containing image data corresponding to said document and wherein said scanning means scans the document along horizontal and vertical lines;
extracting means for deriving from the video signal a plurality of character blocks, each of which contains image data of individual characters in said document, and outputting a corresponding character block signal, said extracting means including a plurality of segmentation stages including a first segmentation stage for segmenting character-string blocks, a second segmentation stage for segmenting each character-string block into separate character blocks each containing character image data of a character unit and a third segmentation stage for checking the continuity of image data containing bits within each character block for detecting discontinuities in order to separate the character blocks into two or more character blocks, each containing a minimum character unit;
combining means, which is selectively supplied with the character block signal, for recombining two or more character blocks to form a combined character block and outputting a combined character block signal;
re-segmenting means, which is supplied with the character block signal and the combined character block signal, for selectively re-segmenting one or more selected character blocks to form a re-segmented character block and outputting a corresponding re-segmented character block signal;
character recognition means, which is supplied with the character block signal, the combined character block signal and the re-segmented character block signal, for performing character recognition according to predetermined algorithms and outputting a "recognized character" indicative signal; and
encoding means for controlling the operation of said combining, re-segmentation and character recognition means in such a manner that said encoding means selectively operates one of said combining and re-segmenting means when said character recognition means fails to recognize a character in said character block, so as to assure recognition of character in said character recognition means with the character block formed by the selected one of said combining and re-segmenting means.

31. A character recognition system as set forth in claim 30, wherein said extracting means defines said character area to have edges thereof striking the upper, lower and side contours of said minimum character unit contained therein.

32. A character recognition system as set forth in claim 30, wherein said extracting means further comprises a fourth stage for removing noise components in the image data of said character units.

33. A character recognition system as set forth in claim 30, which further comprises predetermined character detection means for detecting a predetermined character and controlling the character recognizing operation of said character recognition means for said predetermined character by selecting an auxiliary algorithm which is simpler than the predetermined algorithms.

34. A character recognition system as set forth in claim 30, wherein said first segmentation stage checks the level of a y-projection profile of the document image data for selecting horizontal scanning lines to be included in each of said character-string blocks.

35. A character recognition system as set forth in claim 34, wherein said second segmentation stage checks the level of an x-projection profile of the document image data with respect to a predetermined threshold level for selecting the vertical scanning lines to be included in said character block.

36. A character recognition system as set forth in claim 35, wherein said second segmentation stage employs a plurality of mutually different threshold levels for segmenting said character block at different levels of precision into minimum character units.

37. A character recognition system as set forth in claim 36, wherein said extracting means generates segmentation history data indicative of the manner in which each character-string block and character block have been segmented and said encoding means is supplied with said segmentation history data with respect to said second, third and fourth segmentation stages to thereby control the operation of the character recognition means, the combining means and the re-segmenting means in accordance therewith.

38. A character recognition system as set forth in claim 37, wherein said encoding means obtains the segmentation history data with respect to each character block in the respective second, third and fourth segmentation stages.

39. A character recognition system comprising
first means for receiving a video signal containing character image data;
extracting means for deriving from the video signal a plurality of character blocks, each of which contains image data of individual characters, said extracting means including a plurality of segmentation stages inclucing a first segmentation stage for segmenting character-string blocks into character blocks, a second segmentation stage for segmenting each character block containing a character unit of image data and a third segmentation stage for checking the continuity of image data containing bits within each character block for detecting discontinuity in order to separate character blocks into more than one character block so as to obtain character blocks which each contain a minimum character unit and wherein the extracting means generates segmentation history data with respect to at least said second and third segmentation stages performed by said extracting means, which segmentation history data is indicative of the order of segmentation of each character block in each of said second and third stages;
combining means for recombining two or more character blocks for forming a combined character block;
re-segmenting means for re-segmenting character block for forming a re-segmented character block;
character recognition means for performing character recognition according to predetermined algorithms and outputting recognized character indicative signal; and
encoding means connected to said extracting means for obtaining the segmentation history data, and controlling the operation of said combining and character recognition means based on said segmentation history data in such a manner that said encoding means seletively operates one of said combining means and re-segmenting means when said character recognition means fails to recognize a character in said character block, so as to assure recognition by said character recognition means of the character in the character block formed by the selected one of said combining and re-segmenting means.

40. A character recognition system as set forth in claim 39, wherein said third stage further detects overlap between adjacent, but separable character units contained in a single character block and separates said character units into one or more separate character blocks.

41. A character recognition system as set forth in claim 40, wherein said extracting means further comprises a fourth segmentation stage for removing noise components in said character image data for each of said character blocks.

42. A character recognition system as set forth in claim 39, which further comprises predetermined character detection means for detecting a predetermined character and controlling the character recognizing operation of said character recognition means for said predetermined character by selecting an auxiliary algorithms which is simpler than the predetermined algorithms.

43. A character recognition system as set forth in claim 39, further comprising scanning means for repeatedly scanning, over a plurality of lines in the X and Y direction, a document on which are printed characters to produce the video signal containing the character image data and wherein said first segmentation stage checks the level of a y-projection profile of the image data for selecting the horizontal scanning lines of the scanning means to be included in each of said character-string blocks.

44. A character recognition system as set forth in claim 43, wherein said second segmentation stage checks the level of an x-projection profile of the image data with respect to a predetermined threshold level for selecting the vertical scanning lines of the scanning means to be included in said character block.

45. A character recognition system as set forth in claim 44, wherein said second segmentation stage employs a plurality of mutually different threshold levels for segmenting said character block at different levels of precision into minimum character units.

46. A character recognition system as set forth in claim 39, wherein said encoding means alternatively sets a flag to a logical HIGH level and a logical LOW level for character blocks segmented by each of said second and third segmentation stages in forming said segmentation history.

47. A method for recognizing characters contained in a document comprising the steps of:
generating a video signal containing image data of said document;
from the video data, extracting character blocks, each of which contains image data of individual characters in said document;
combining two or more character blocks for forming a combined character block;
re-segmenting a character block for forming a re-segmented character block;

from the character blocks, the combined character blocks and the re-segmented character blocks, performing character recognition according to predetermined algorithms and outputting a "recognized character" indicative signal; and controlling the combining step, re-segmenting step and character recognition step in such a manner that the combining step, re-segmenting step and character recognition step are selectively performed to ensure recognition of characters by repeating said combining step, re-segmenting step and character recognition step with respect to a selected one or a selected succession of character blocks, combined character blocks or re-segmented character blocks until character recognition is achieved.

48. A character recognition method as set forth in claim 47, wherein said step of extracting said character blocks is performed to extract character blocks containing a minimum character unit.

49. A character recognition method as set forth in claim 47, wherein, in said character block extracting step, a character block area is defined to have edges thereof striking upper, lower and side contours of said minimum character unit.

50. A character recognition method as set forth in claim 47, wherein, in said character block extracting step, overlapping between adjacent individual characters is detected for separately forming character blocks for respetive individual characters.

51. A character recognition method as set forth in claim 50, wherein, in said character block extracting step, noise components contained in the character image data of each of said character blocks is removed.

52. A character recognition method as set forth in claim 51, which further comprises a step of detecting a predetermined character and controlling the character recognizing step for said predetermined character by selecting an auxiliary algorithm which is simpler than the predetermined algorithms.

53. A character recognition method as set forth in claim 47, wherein said step of controlling said combining step, said re-segmenting step and said character recognition step includes the step of obtaining segmentation history data of each character block indicative of the extraction process for said character block, for controlling the combining step based on said segmentation history data.

54. A character recognition method as set forth in claim 53, wherein said character block extracting step includes a plurality of steps for extracting said character blocks from said document image data, and said segmentation history data is obtained during the process of extraction performed in each of said plurality of character block extraction steps.

55. A character recognition method as set forth in claim 54, wherein said character block extracting step includes a step of segmenting each character-string block, a step of segmenting each character-string block into character blocks, a step of detecting more than one character unit in a single character block and separating said character block into more than one character block, each containing separated individual character units.

56. A character recognition method as set forth in claim 55, wherein said video signal generating step comprises optically scanning the document along a plurality of vertical and horizontal lines and the character-string segmentation step includes the step of checking the level of a y-projection profile of the document image data and using that information to select the horizontal scanning lines of the scanning step to be included in each of said character-string blocks.

57. A character recognition method as set forth in cliam 56, wherein said character block segmentation step includes the steps of checking the level of an x-projection profile of the document image data with respect to a predetermined threshold level and using that information to select the vertical scanning lines of the scanning step to be included in said character block.

58. A character recognition method as set forth in claim 57, wherein said character block segmentation step employs a plurality of mutually different threshold levels for segmenting said character block at different levels of precision to have minimum character units.

59. A character recognition method as set forth in claim 56, wherein said character block separating step includes the steps of checking the continuity of the character unit contained in each character block, detecting the discontinuity in the character unit, and separating the character block at such detected discontinuities.

60. A character recognition method as set forth in claim 55, wherein said character block separating step includes the step of checking the continuity between adjacent image data containing bits for detecting discontinuity in the character unit in said character block.

61. A character recognition method as set forth in claim 56, wherein said character block extracting step further comprises a step of checking the level of a y-projection profile for the character image data in said character block for determining the height of said character block so that the upper and lower edges of said character block strike the upper and lower contours of said character unit in said character block.

62. A character recognition method as set forth in claims 1, 19, 30 and 39 wherein the recognized character signal output by the character recognition means is a predetermined, computer recognizable code signal.

63. A character recognition method as set forth in claim 47, wherein the recognized character signal output as a result of the character recognition step is a predetermined, computer recognizable code signal.

* * * * *